US011057564B2

(12) United States Patent
Johnson et al.

(10) Patent No.: US 11,057,564 B2
(45) Date of Patent: Jul. 6, 2021

(54) MULTIPLE LAYER FLEXURE FOR SUPPORTING A MOVING IMAGE SENSOR

(71) Applicant: Apple Inc., Cupertino, CA (US)

(72) Inventors: Brad V. Johnson, Santa Clara, CA (US); Hao Zheng, San Jose, CA (US); Scott W. Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/830,083

(22) Filed: Mar. 25, 2020

(65) Prior Publication Data
US 2020/0314338 A1     Oct. 1, 2020

Related U.S. Application Data

(60) Provisional application No. 62/825,720, filed on Mar. 28, 2019.

(51) Int. Cl.
| | |
|---|---|
| *H04N 5/232* | (2006.01) |
| *H04N 5/225* | (2006.01) |
| *G03B 5/00* | (2021.01) |
| *G02B 27/64* | (2006.01) |

(52) U.S. Cl.
CPC ....... *H04N 5/23248* (2013.01); *H04N 5/2253* (2013.01); *H04N 5/2254* (2013.01)

(58) Field of Classification Search
CPC ............. H04N 5/23248; H04N 5/2254; H04N 5/2253; H04N 5/23287; G03B 2205/0069; G03B 5/00

See application file for complete search history.

(56) References Cited

U.S. PATENT DOCUMENTS

| 7,679,647 | B2 | 3/2010 | Stavely et al. | |
|---|---|---|---|---|
| 8,264,549 | B2 | 9/2012 | Tokiwa et al. | |
| 9,621,775 | B2 | 4/2017 | Ng et al. | |
| 2018/0191957 | A1* | 7/2018 | Miller | ............... G02B 27/646 |
| 2019/0141248 | A1* | 5/2019 | Hubert | ............... G02B 27/646 |

FOREIGN PATENT DOCUMENTS

WO     2017156462     9/2017

OTHER PUBLICATIONS

International Search Report and Written Opinion from PCT/US2020/025410, dated Aug. 13, 2020, pp. 1-12.

* cited by examiner

*Primary Examiner* — Christopher K Peterson
(74) *Attorney, Agent, or Firm* — Robert C. Kowert; Kowert, Hood, Munyon, Rankin & Goetzel, P.C.

(57) ABSTRACT

Some embodiments may include a multi-layer flexure that may be used in an optical image stabilization voice coil motor (OIS VCM) actuator of a camera. The multi-layer flexure module may include a dynamic platform and a static platform along with multiple layers of flexure arms that mechanically connect the dynamic platform to the static platform. In some examples, the multi-layer flexure may include electrical traces configured to convey signals from the dynamic platform to the static platform. The electrical traces may be routed from the dynamic platform to the static platform via the flexure arms. In some embodiments, a multi-layer flexure may have a greater stiffness in a Z-direction aligning with an optical axis of a camera and may have a lower stiffness in X and Y directions corresponding to optical image stabilization directions of an OIS VCM actuator.

20 Claims, 17 Drawing Sheets

Section A-A

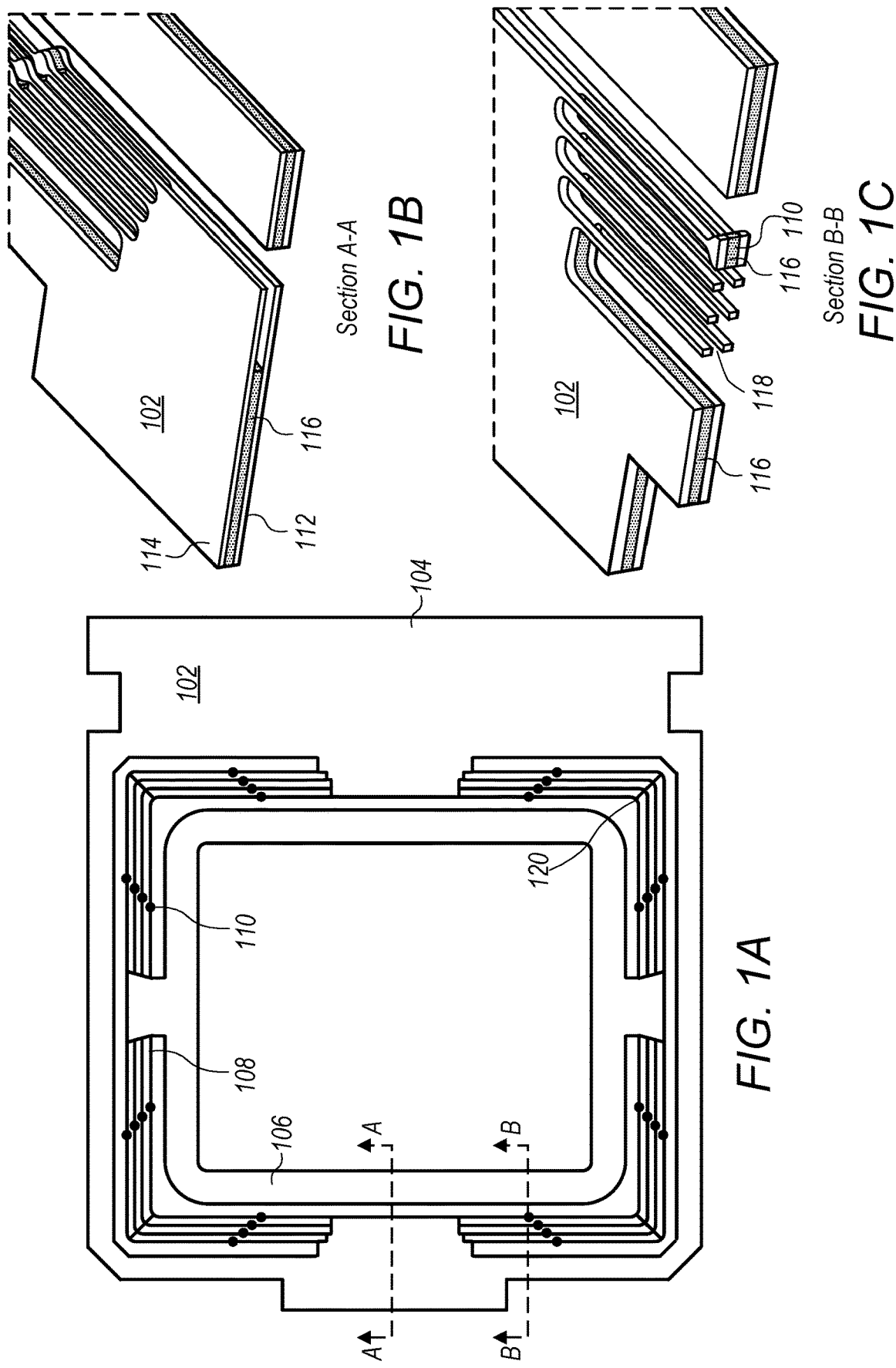

FIG. 7B Top View

FIG. 7C Front Side View

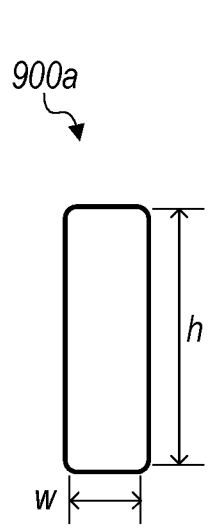
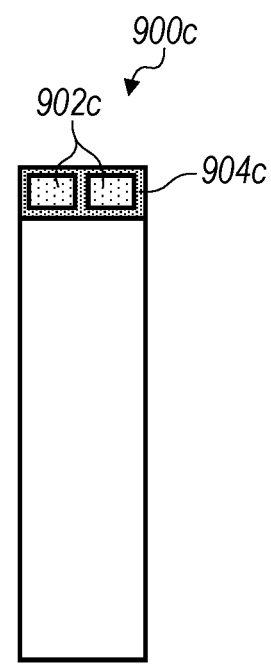
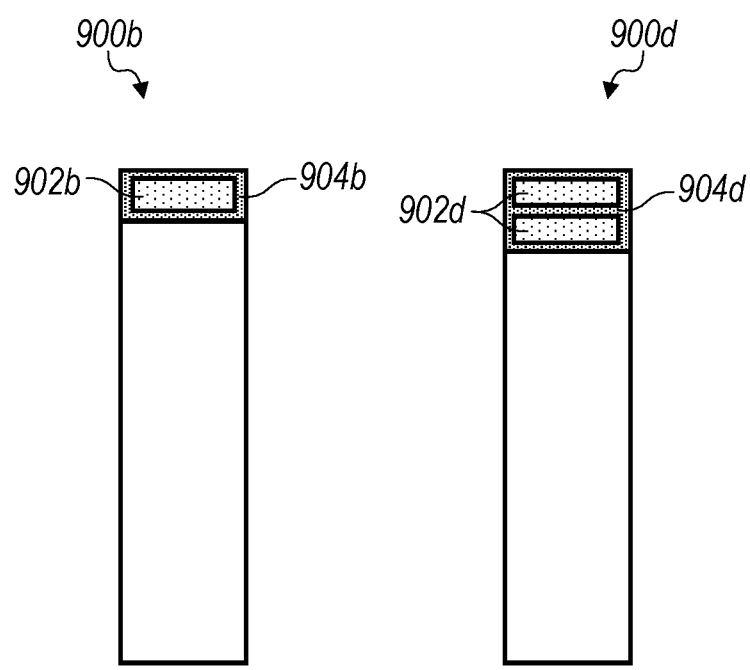
FIG. 9A  FIG. 9C
FIG. 9B  FIG. 9D

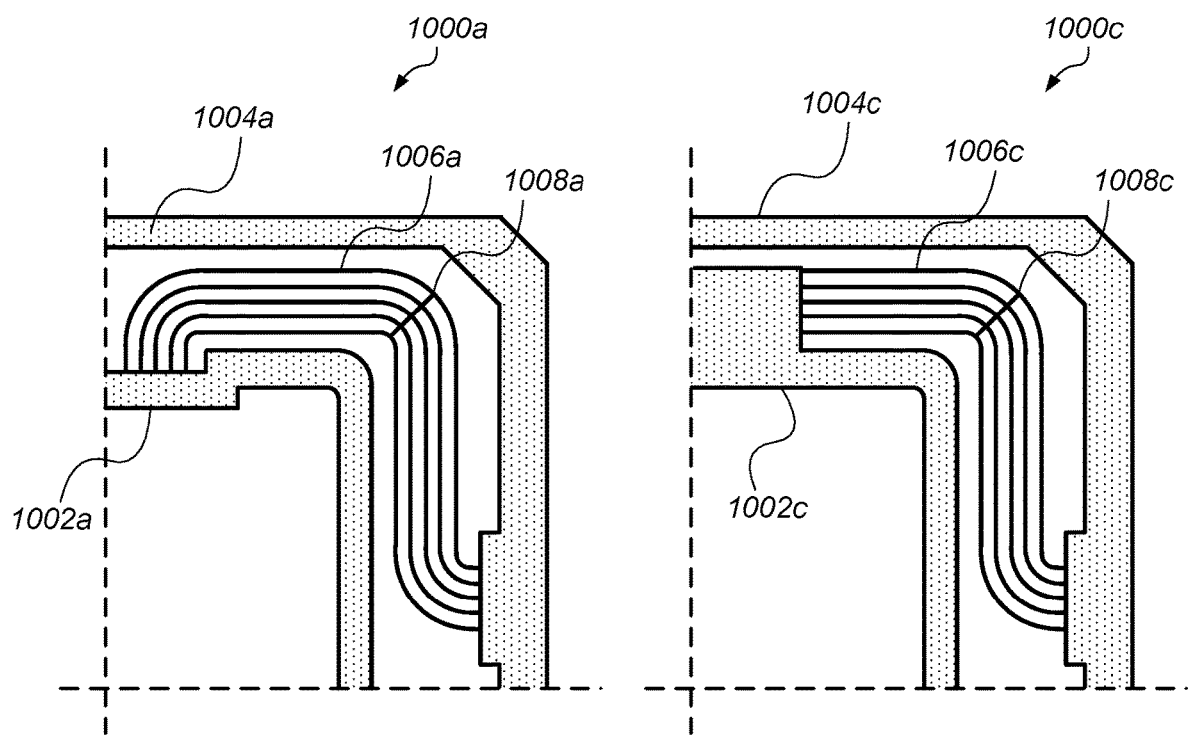
FIG. 10A
FIG. 10C
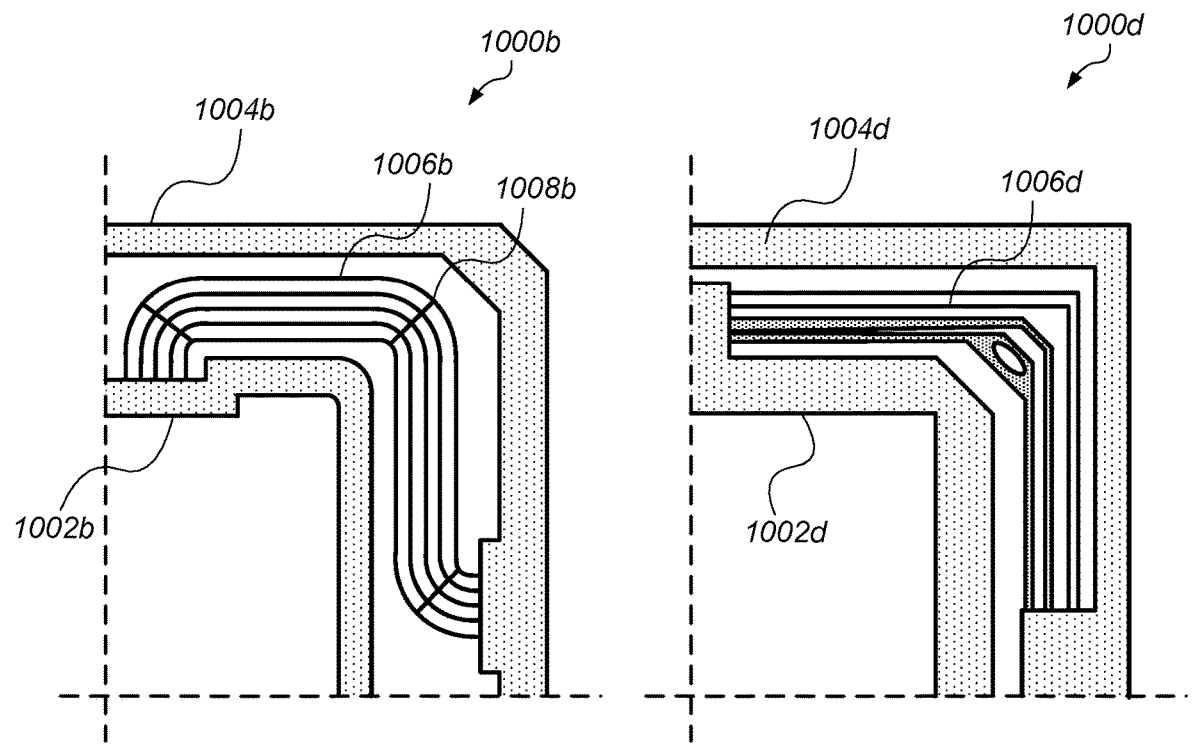
FIG. 10B
FIG. 10D

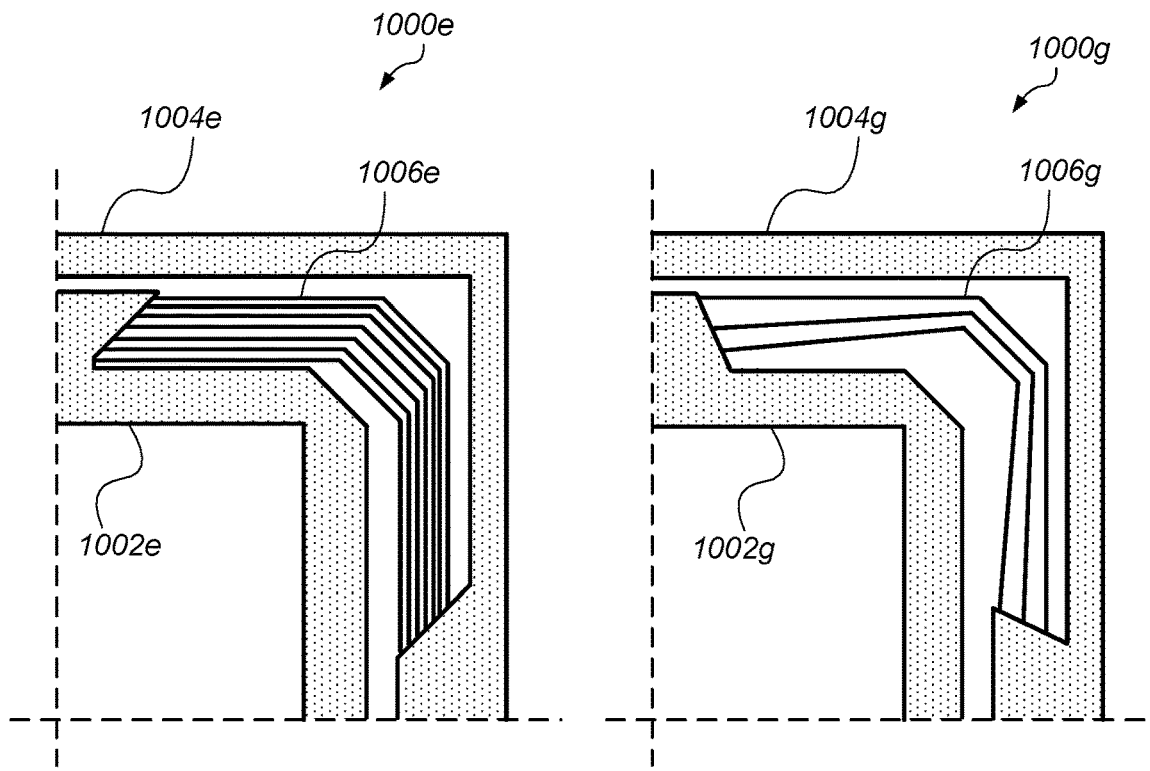
FIG. 10E
FIG. 10G
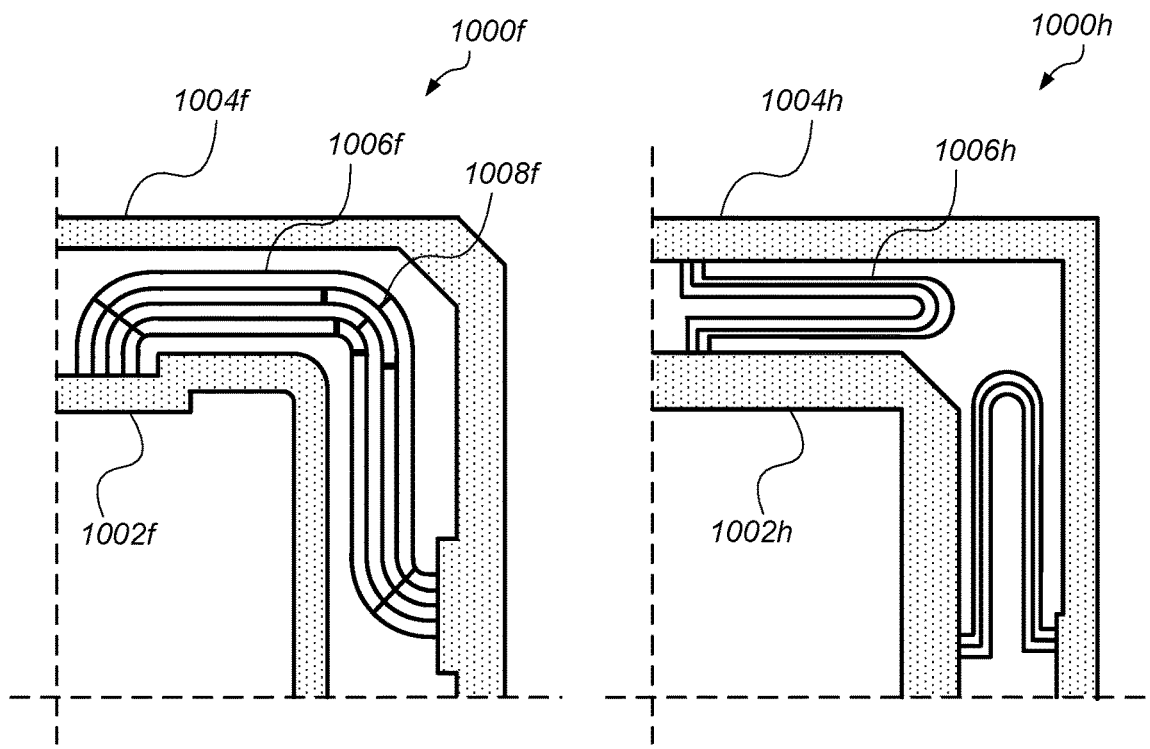
FIG. 10F
FIG. 10H

MULTIPLE LAYER FLEXURE FOR SUPPORTING A MOVING IMAGE SENSOR

PRIORITY CLAIM

This application claims benefit of priority to U.S. Provisional Application Ser. No. 62/825,720, entitled "Multiple Layer Flexure for Supporting a Moving Image Sensor", filed Mar. 28, 2019, and which is incorporated herein by reference in its entirety.

BACKGROUND

Technical Field

This disclosure relates generally to a camera actuator and/or suspension system and more specifically to an actuator/suspension system for an image sensor in a camera with a moving image sensor arrangement.

Description of the Related Art

The advent of small, mobile multipurpose devices such as smartphones and tablet or pad devices has resulted in a need for high-resolution, small form factor cameras for integration into the small, mobile multipurpose devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby an object focal distance can be adjusted to focus an object plane in front of the camera at an image plane to be captured by an image sensor of the camera. In some such autofocus mechanisms, the optical lens is moved as a single rigid body along the optical axis (referred to as the Z axis) of the camera to refocus the camera.

In addition, high image quality is easier to achieve in small form factor cameras if lens motion along the optical axis is accompanied by minimal parasitic motion in the other degrees of freedom, for example on the X and Y axes orthogonal to the optical (Z) axis of the camera. Thus, some small form factor cameras that include autofocus mechanisms may also incorporate optical image stabilization (OIS) mechanisms that may sense and react to external excitation/disturbance by adjusting location of the optical lens on the X and/or Y axis in an attempt to compensate for unwanted motion of the lens.

SUMMARY OF EMBODIMENTS

In some embodiments, a camera includes a lens holder, an image sensor, and a flexure assembly that supports the image sensor relative to the lens holder. The lens holder includes one or more lens elements coupled to the lens holder, wherein the lens elements define an optical axis for the camera. The image sensor is configured to capture light passing through the one or more lens elements and is configured to convert the captured light into image signals. The flexure assembly supports the image sensor above or below the lens holder and includes a first frame coupled to the image sensor, a second frame coupled to a stationary component of the camera, a first layer of flexure arms, and a second layer of flexure arms. The first frame coupled to the image sensor is configured to move with the image sensor and receive image signals generated by the image sensor. The first and second layers of flexure arms are each configured to mechanically connect the first frame to the second frame and are configured to provide respective paths for electrical traces that route the image signals from the first frame to the second frame. The second frame may include one or more connectors that connect the second frame to circuits of the camera that further process the image signals or cause the image signals to be displayed. The second layer of flexure arms is mounted above or below the first layer of flexure arms, wherein the first layer of flexure arms and the second layer of flexure arms are separated, at least in part, by an open space between the layers of flexure arms.

The arrangement of multiple layers of flexure arms of a flexure, one above the other, in a camera or voice coil motor actuator may provide greater stiffness in a Z-direction along an optical axis of the camera than in an X or Y direction orthogonal to the optical axis. This arrangement may also cause an image sensor coupled to a dynamic platform of the flexure assembly to maintain a constant or near constant Z-position, while allowing the image sensor to move in the X and Y directions, for example in response to optical image stabilization (OIS) actuation. Additionally, the use of multiple layers of flexure arms in a flexure assembly may provide more paths for electrical traces than if a single layer of flexure arms were used in the flexure assembly. This in turn may allow a flexure assembly, comprising multiple layers of flexure arms, to be more compact as compared to a single layer flexure assembly while still being able to transmit a similar or greater volume of image signals.

In some embodiments, a voice coil motor actuator includes one or more actuator magnets, one or more actuator coils, a dynamic platform configured to be coupled to an image sensor and a static platform, wherein the dynamic platform is configured to move relative to the static platform (though the static platform may also move relative to other components of the camera). The voice coil motor actuator also includes a first layer of flexure arms configured to mechanically connect the dynamic platform to the static platform. Additionally, the voice coil motor actuator includes a second layer of flexure arms, mounted above or below the first layer of flexure arms, and configured to mechanically connect the dynamic platform to the static platform. The first layer of flexure arms and the second layer of flexure arms are separated at least in part by an open space between the respective flexure arms of the first layer and the second layer. The one or more actuator magnets and the one or more actuator coils are configured to magnetically interact to move the dynamic platform relative to the static platform in a plurality of directions parallel to a plane running through the first layer and the second layer of flexure arms.

In some embodiments, a mobile multifunction device includes a camera module comprising one or more lens elements that define an optical axis and an image sensor configured to capture light passing through the one or more lens elements and convert the captured light into image signals. The mobile multifunction device also includes a dynamic frame coupled with the image sensor, a static frame, a first layer of flexure arms that mechanically connect the dynamic frame to the static frame, and a second layer of flexure arms, mounted above or below the first layer of flexure arms, that mechanically connect the dynamic frame to the static frame. The dynamic frame and flexure arms are configured to allow the dynamic frame to move relative to the static frame. The first layer of flexure arms and the second layer of flexure arms are separated at least in part by an open space between the flexure arms of the first layer and the second layer. The mobile multifunction device also includes electrical traces configured to convey the image signals from the dynamic frame to the static frame. Additionally, the mobile multifunction device includes a display and one or more processors configured to cause the display to present an image based at least in part on one or more of the image signals that have been conveyed from the dynamic frame to the static frame via the electrical traces.

BRIEF DESCRIPTION OF THE DRAWINGS

FIG. 1A illustrates a top view of a multi-layer flexure comprising a dynamic platform, a static platform, and multiple layers of flexure arms connecting the static and dynamic platforms, according to some embodiments.

FIG. 1B illustrates a perspective view of a section of a multi-layer flexure comprising a dynamic platform, a static platform, and multiple layers of flexure arms connecting the static and dynamic platforms, according to some embodiments.

FIG. 1C illustrates a perspective view of a section of a multi-layer flexure comprising a dynamic platform, a static platform, and multiple layers of flexure arms connecting the static and dynamic platforms, according to some embodiments.

FIGS. 7A-7C illustrates a multi-layer flexure comprising a dynamic platform, a static platform, and multiple layers of flexure arms connecting the static and dynamic platforms shifting the dynamic platform in the Y-direction, according to some embodiments.

FIGS. 9A-9H each illustrate a cross-sectional view of a respective example flexure arm, in accordance with some embodiments. In some cases, one or more embodiments of the example flexure arms may be used in a multi-layer flexure, according to some embodiments.

FIGS. 10A-10L each illustrate a partial top view of a respective example flexure arm configurations, in accordance with some embodiments. In some cases, one or more embodiments of the example flexure arm configurations of FIGS. 10A-10L may be used in a multi-layer flexure, according to some embodiments.

Figure 1D:
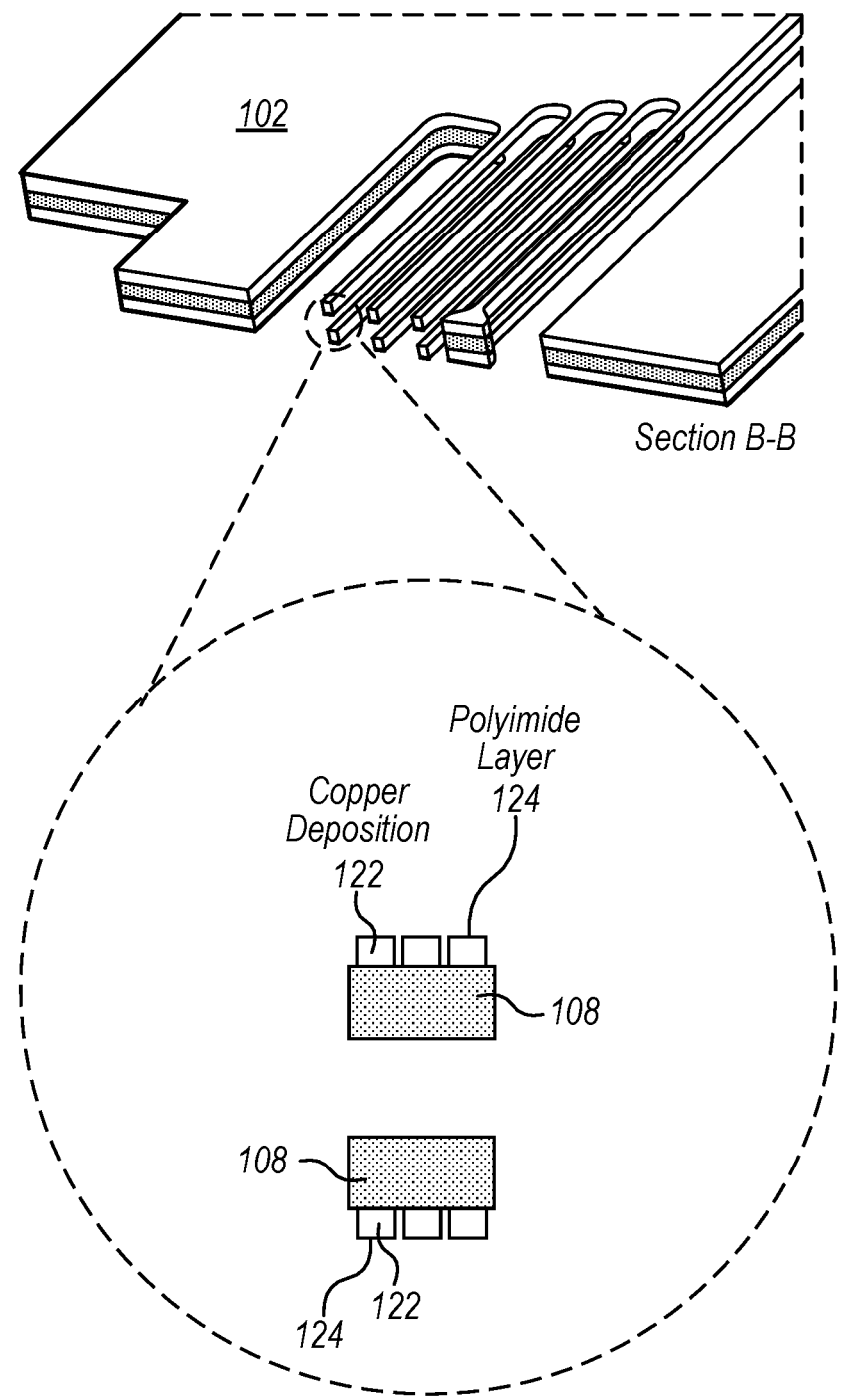
FIG. 1D illustrates electrical traces on flexures arms of a multi-layer flexure, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors.

Consider the phrase "determine A based on B." While in this case, B is a factor that affects the determination of A, such a phrase does not foreclose the determination of A from also being based on C. In other instances, A may be determined based solely on B.

DETAILED DESCRIPTION

Multi-Layered Flexure Arrangement

In some embodiments, a multi-layered flexure assembly comprises a dynamic platform, a static platform, and multiple layers of flexure arms connecting the static and dynamic platforms. The dynamic platform may comprise a first frame that couples with an image sensor. The static platform may comprise a second frame that couples with a static portion of a camera, such as a circuit board that receives image signals from the image sensor via electrical traces routed over flexure arms mechanically connecting the dynamic and static platforms. The multi-layered flexure may further comprise spacer elements that mechanically connect flexure arms of an upper layer of flexure arms to flexure arms of a lower layer of flexure arms at respective points along respective spans of the flexure arms of the upper and lower layers. For example, spacer elements that mechanically connect flexure arms at different levels of a multi-layered flexure may effectively reduce the beam length of the flexure arms by restricting motion of the flexure arms relative to one another in the Z-direction where the flexure arms of different layers are mechanically connected to each other. This may cause the multi-layered flexure to have a greater stiffness in the Z-direction than in the X or Y directions. For example, a dynamic platform that supports an image sensor of a multi-layered flexure may have a stiffness that restricts motion of the image sensor in the Z-direction (e.g. along the optical axis) that is as much as three times the stiffness of a single layer flexure in the Z-direction. Also, the multi-layer flexure may have a stiffness in the X-direction and/or the Y-direction that is similar to the stiffness in the X-direction and/or the Y-direction of a single layer flexure. Thus, a multi-layer flexure may provide greater Z-stiffness (and therefore greater image sensor stability along the optical axis) than a single-layer flexure while still being flexible in the X and Y directions such that magnets and coils of a voice coil motor may cause the image sensor to move in the X and Y directions.

Also, in some embodiments, a multi-layered flexure may have a smaller footprint than a single layered flexure. For example, in some embodiments, electrical traces may be routed via flexure arms of a multi-layered flexure using flexure arms of more than one layer. Accordingly, since there are multiple layers of flexure arms, there are more flexure arms in an X-Y footprint of a multi-layer flexure to route electrical traces than would be the case in a single layer flexure. For example, electrical traces may be routed on flexure arms of different layers of the multi-layer flexure, thus reducing a number of flexure arms necessary to be included in each layer of the multi-layer flexure to route a given number of electrical traces.

Also, in some embodiments, a multi-layer flexure may use a thinner metal material for each layer of the multiple layers than is used for a flexure comprising only a single layer. This is because the Z-stiffness of the multi-layer flexure results from the combined stiffness of the multiple layers and is further affected by mechanical connections between layers via spacer elements. The combination of layers may form a structure that is stiffer in the Z-direction than the stiffness of any individual layer, and therefore may permit the separate layers to be constructed of a thinner material than would be required to achieve a similar Z-stiffness using a single layer flexure. The use of a thinner metal material for each of the layers of a multi-layer flexure may improve manufacturability of the multi-layer flexure as compared to a flexure comprising only a single layer by reducing issues in regard to etching that make fabrication of a single layer flexure with a thicker metal layer more difficult.

In some embodiments, a multi-layer flexure may further include one or more flexure stabilizers that restrict motion of flexure arms relative to one another within a layer of a multi-layer flexure. For example, a flexure stabilizer may connect flexures, in a same layer, in a plane orthogonal to the optical axis, whereas a spacer element may connect flexures in different layers in a plane parallel to the optical axis.

In some embodiments, a Z-stiffness, an X-stiffness, and/or a Y-stiffness of a multi-layer flexure may be tuned by adjusting a number of flexure arms included in the multi-layer flexure, by adjusting a thickness of the flexure arms included in the multi-layer flexure, by including more or fewer spacer elements in the multi-layer flexure, by adjusting relative positions of spacer elements included in the multi-layer flexure and/or by adjusting a number or position of flexure stabilizers included in the multi-layer flexure. In some embodiments, other variables may be adjusted to adjust a Z-stiffness, an X-stiffness, and/or a Y-stiffness of a multi-layer flexure.

FIG. 1A illustrates a top view of a multi-layer flexure comprising a dynamic platform, a static platform, and multiple layers of flexure arms connecting the static and dynamic platforms, according to some embodiments.

Multi-layer flexure 102 includes static platform/static frame 104, dynamic platform/dynamic frame 106, and flexure arms 108. Multi-layer flexure 102 also includes spacer elements 110 that mechanically connect flexure arms 108 of different layers to one another at respective points along the respective spans of the flexure arms 108. Additionally, multi-layer flexure 102 includes flexure stabilizers 120 that maintain separation between flexure arms 108 in a given layer of the multiple layers of the multi-layer flexure 102.

In some embodiments, a static platform, such as static platform 104, may include a second frame that surrounds the flexure arms 108 and the dynamic platform 106. In some embodiments, a second frame and a static platform may be the same component or a second frame may be coupled to a static platform as two components coupled together. In some embodiments, a dynamic platform, such as dynamic platform 106, may be located within a circumference at least partially formed by flexure arms, such as flexure arms 108, and may include a first frame. In some embodiments, the dynamic platform and a first frame may be the same component, or a first frame may be coupled to a dynamic platform as two components coupled together. In some embodiments, a dynamic platform, such as dynamic platform 106, may be formed by an image sensor coupled to a first frame that is located within a second frame and that is mechanically connected to the second frame via flexure arms at multiple layers of the multi-layer flexure.

In some embodiments, the flexure arms 108 may enable the dynamic platform 106 and/or first frame to move relative to the static platform 104 and/or second frame. Note that in some embodiments, the static platform 104 and/or second frame may be coupled to a fixed structure of a camera or mobile device or may be coupled to another component of a camera or mobile device that is able to move relative to other components of the camera or mobile device. It worth pointing out that when a multi-layer flexure is included in a voice coil motor (VCM), a first frame may include a dynamic platform that couples with another component of the camera such as an image sensor. Also, a second frame may include a static platform that couples with another component of the camera such as a printed circuit board or structural element of the camera. In some embodiments, the first frame may include multiple dynamic platform layers of the multi-layer flexure that are coupled together via a spacer material and the second frame may include multiple stat platform layers that are coupled together via a spacer material. Furthermore, the first frame may also include electrical traces carried on or more of the dynamic platform layers. Also, the second frame may include electrical traces carried on one or more of the static platform layers, wherein the flexure arms also carry electrical traces connecting the electrical traces of the dynamic platform layers to the electrical traces of the static platform layers.

In some embodiments, spacer elements, such as spacer elements 110, may be located along a span of a flexure arm at a location that is roughly midway between a connection of the flexure arm to a static or dynamic platform and a flexure stabilizer, such as one of flexure stabilizers 120. In some embodiments, wherein connections between the flexure arms and the static or dynamic platforms are staggered within a layer of the multi-layer flexure, the spacer elements, such as spacer elements 110, may be staggered in a similar pattern such that the spacer elements are at the mid-points of the respective spans of the respective flexure arms, such as flexure arms 108. In some embodiments, a portion of the flexure arms corresponding to the spacer elements, such as spacer elements 110, may be slightly larger than other portions of the flexure arms as shown in FIGS. 1A-C, or in some embodiments, the portions of the flexure arms corresponding to the spacer elements may be the same width as the flexure arms.

As discussed in more detail below in regard to FIGS. 3-4, in some embodiments, motion of a dynamic platform, such as dynamic platform 106, may be controlled by a voice coil motor (VCM) actuator in the X-direction and Y-direction, but may be uncontrolled in the Z-direction, wherein the intention is for motion in the Z-direction to be small or zero. Because a multi-layer flexure may have a significantly greater stiffness in the Z-direction than in the X and Y directions, the multi-layer flexure may flex in the X and Y directions while remaining primarily stable (e.g. not moving) in the Z-direction. In other embodiments, a position of the image sensor in the Z-direction may be controlled via a voice coil motor actuator acting in the Z-direction. In such embodiments, one or more parameters of the multi-layer flexure may be adjusted to adjust the Z-stiffness of the multi-layer flexure. For example fewer spacer elements may be used, or thinner flexure arms may be used, to reduce a Z-stiffness of the multi-layer flexure.

In some embodiments, a multi-layer flexure such as multi-layer flexure 102, may include four or fewer flexure arms per layer in a given quadrant of the multi-layer flexure. For example, multi-layer flexure 102 illustrated in FIG. 1A includes four flexure arms per quadrant per layer. For example the upper layer 114 includes four flexure arms 108 per quadrant. Also, lower layer 112 includes four flexure arms 108 per quadrant.

FIGS. 1B and 1C illustrate perspective views of sections of a multi-layer flexure, according to some embodiments. Multi-layer flexure 102 illustrated in FIGS. 1B and 1C may be the same multi-layer flexure 102 as illustrated in FIG. 1A.

As shown in FIGS. 1B and 1C, a spacer element, such as spacer element 110, may comprise a spacer material 116 placed between upper layer 114 and lower layer 112 of a multi-layer flexure 102. However, an open space may remain between the flexure arms of the respective layers such that there is an air gap between the flexure arms that allows the flexure arms at different layers of the multi-layer flexure 102 to move relative to one another. For example, FIG. 1C illustrates air gap 118 between flexure arms 108 of upper layer 114 and flexure arms 108 of lower layer 112. In some embodiments, air gap 118 may have a height of approximately 80 microns or other suitable heights.

FIG. 1C also illustrates a cross section of spacer element 110, wherein spacer material 116 mechanically connects a flexure arm 108 of upper layer 114 with a flexure arm 108 of lower layer 112. In some embodiments, the spacer material may be or may comprise an adhesive bonding material, a solder material, or a metal plating material that mechanically connects the flexure arm of the upper layer to the flexure arm of the lower layer, wherein the upper and lower flexure arms are mechanically connected at the point of the spacer element along a span of the respective flexure arms.

In some embodiments, flexure stabilizer members, such as flexure stabilizers 120, may be configured to mechanically connect flexure arms 108 of upper layer 114 with other flexure arms 108 of upper layer 114 to prevent interference between the flexure arms of the same layer. For example, when the flexure arms of a given layer are deformed due to the dynamic platform shifting in the X-direction or Y-direction, the flexure stabilizers 114 may maintain spacing between the flexure arms at a location of the flexure stabilizer, such as a corner of the multi-layer flexure 102. In a similar manner, flexure stabilizers of lower layer 112 may prevent interference between the flexure arms 108 of the lower layer 112. For example, the flexure stabilizers 120 may constrain movement of the flexure arms of the upper layer 114 or the lower layer 112 relative to other ones of the flexure arms of the respective upper or lower layer in a plane running through the upper or the lower layer.

In some embodiments, the spacer elements 110 may be placed at a mid-point along a span of the respective flexure arms between a connection to the static platform or a connection to the dynamic platform and a respective flexure stabilizer at a corner of the flexure arms between the static platform and the dynamic platform.

In some embodiments, electrical traces may be routed from a dynamic platform, such as dynamic platform 106, to a static platform, such as static platform 104, via flexure arms, such as flexure arms 108. In some embodiments, the electrical traces may be electrically isolated from the metal flexure arms by polymide insulator layers. In some embodiments, the flexure arms may carry multiple layers of electrical signal traces electrically isolated from the metal flexure bodies of the flexure arms and from one another by polymide insulator layers. In some embodiments, other types of insulators and trace elements may be used.

For example, FIG. 1D illustrates electrical traces on flexures arms of a multi-layer flexure, according to some embodiments. For example, dynamic platform 106 is connected to a static platform 104 by flexures 108 carrying electrical traces composed of copper deposition 122 shielded by a polyimide layer 124.

Figure 2:
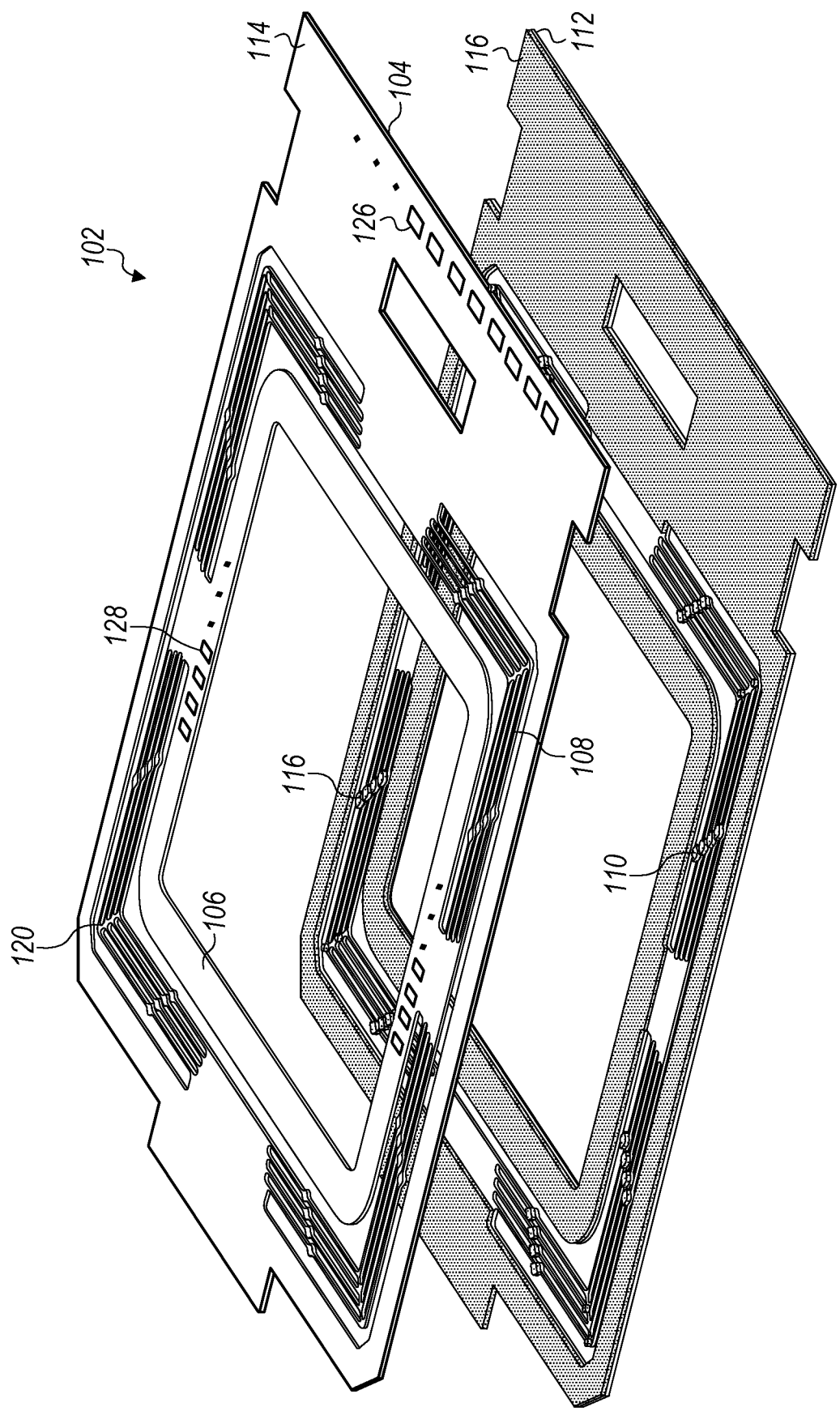
FIG. 2 illustrates an exploded view of a multi-layer flexure comprising a dynamic platform, a static platform, and multiple layers of flexure arms connecting the static and dynamic platforms, according to some embodiments.

FIG. 2 illustrates an exploded view of a flexure comprising a dynamic platform, a static platform, and multiple layers of flexure arms connecting the static and dynamic platforms, according to some embodiments. Multi-layer flexure 102 illustrated in FIG. 2 may be the same multi-flexure 102 as illustrated in FIGS. 1A-1D, in some embodiments.

In FIG. 2, upper layer 114 is illustrated in an exploded view above spacer material 116 that is bonded with lower layer 112. Note that spacer elements 110 include spacer material 116 at the location of the spacer elements 110. FIG. 2 also illustrates connectors 128 on dynamic platform 106 and connectors 126 on static platform 104, wherein electrical traces are routed between connectors 128 on dynamic platform 106 and connectors 126 on static platform 104 via electrical traces mounted on flexure arms 108. Connectors 126 and 128 are illustrated as examples, but in some embodiments, any number of connectors and/or different types of connectors may be used.

In some embodiments, an image sensor mounted to a dynamic platform, such as image sensor 308 mounted on dynamic platform 322 (shown in FIG. 3) or an optical image stabilization circuit, such as flexible printed circuit board 518 that functions as a dynamic platform relative to a static portion of multiple layer flexure 522 (shown in FIG. 5), may send or receive signals to or from connectors of a dynamic or static platform, such as connectors 126 or 128. For example, in some embodiments, connectors 128 on dynamic platform 106 may couple with connectors of an image sensor and connectors 126 on static platform 104 may couple with other camera components that send or receive signals to or from the image sensor. In some embodiments, electrical traces are routed between the connectors 126 and 128 via the static platform 104, flexures arms 108, and dynamic platform 106. In some embodiments, electrical traces may be located on the static platform 114, flexure arms 108, and dynamic platform 106 of upper flexure layer 114. In some embodiments, electrical traces may be located on the static platform 114, flexures arms 108, and dynamic platform 106 of the lower flexure layer 112. In some embodiments, electrical traces may be routed on both an upper flexure layer 114 and a lower flexure layer 112. In some embodiments, one or more vias may pass through the spacer material 116 to connect a portion of an electrical trace on one of the upper flexure layer 114 or lower flexure layer 116, to another portion of the electrical trace on the other one of the upper flexure layer 114 or the lower flexure layer 116. In some embodiments, such electrical traces may receive or transmit information and/or power between components coupled to the respective connectors 126 or 128.

In some embodiments, a multi-layer flexure, such as multi-layer flexure 102, may include electrical traces on both upper and lower flexure layers. For example, in some embodiments, upper flexure layer 114 and spacer material 116 may include openings (not shown) adjacent to or similar to connectors 126 that allow some elements of a connector to pass through the upper layer 114 and the spacer material 116 to engage with connectors (not shown) on an upper surface of lower layer 112. Also, in some embodiments connectors may be located on opposite sides of a multi-layer flexure assembly, such as multi-layer flexure 102. For example, a first set of connectors may be located on an outward facing surface of an upper flexure layer 114 and another set of connectors may be located on an outward facing surface of a lower flexure layer 112. In such embodiments, one or more vias may pass between the layers to transmit signals/power between electrical traces on the upper flexure layer 114 and electrical traces on the lower flexure layer 112. Also, in some embodiments, a spacer element 110 may include a spacer material 116 and a via (not shown) that passes through the spacer material to connect electrical traces located on the respective upper flexure layer 114 and lower flexure layer 112. Additionally, though not shown in each figure, other multi-layer flexures as described herein, such as in in FIGS. 1A-1D, 2-8, etc. may include connectors as described above.

Example of Magnetic Sensing for Autofocus Position Detection

In some embodiments, a compact camera module that includes a multi-layer flexure may also include actuators to deliver functions such as autofocus (AF) and optical image stabilization (OIS). One approach to delivering a very compact actuator for OIS is to use a Voice Coil Motor (VCM) arrangement.

In some embodiments, an optical image stabilization voice coil motor (OIS VCM) actuator is designed such that the image sensor is mounted on a dynamic frame which translates in X and Y. An image sensor (wirebonding, flip/chip, BGA) may be mounted on the dynamic platform with run out electrical signal traces using an additive copper deposition process to connect the image sensor from the dynamic platform to the static platform. Flexure arms connect the dynamic platform to the static platform and support electrical signal traces formed via the additive copper deposition process. Optical image stabilization (OIS) coils are mounted on the dynamic platform. In some embodiments, the OIS coils interact with shared permanent magnets that are also used as part of an autofocus (AF) voice coil motor. In some embodiments, OIS permanent magnets are mounted on a static portion of the optical image stabilization actuator to provide additional Lorentz force (e.g. in case of high in-plane flexure stiffness).

Some embodiments include a camera. The camera may include a lens, an image sensor, and an autofocus voice coil motor (AF VCM) actuator. The lens may include one or more lens elements mounted in a lens holder that define an optical axis for the camera (e.g. Z-axis). The image sensor may be configured to capture light passing through the lens elements. Furthermore, the image sensor may be configured to convert the captured light into image signals that are routed over electrical traces mounted on the flexure arms to other components of the camera, such as other circuits that further process the image signals or cause the captured image to be stored or displayed.

In some embodiments, a camera actuator includes an actuator base, an autofocus voice coil motor, and an optical image stabilization voice coil motor. In some embodiments, the autofocus voice coil motor includes a lens holder mounting attachment moveably mounted to the actuator base, a plurality of shared magnets mounted to the actuator base, and an autofocus coil fixedly mounted to the lens holder mounting attachment for producing forces for moving the lens holder in a direction of an optical axis of one or more lenses of the lens holder. In some embodiments, the optical image stabilization voice coil motor includes an image sensor carrier (e.g. dynamic platform) moveably mounted to the actuator base, and a plurality of optical image stabilization coils moveably mounted to the dynamic platform within the magnetic fields of the shared magnets, for producing forces for moving the dynamic platform in a plurality of directions orthogonal to the optical axis.

In some embodiments, shifting the image sensor allows reduction of the moving mass, and therefore there is a clear benefit in power consumption in comparison to OIS "optics shift" designs. In some embodiments, manufacturing is accomplished with the electrical traces being directly deposited on the multi-layer flexure, using an additive copper deposition process, which enables smaller size package while satisfying the I/O requirements.

In some embodiments, the optical image stabilization coils are mounted on a flexible printed circuit carrying power to the coils for operation of the optical image stabilization voice coil motor.

In some embodiments, the optical image stabilization coils are corner-mounted on a flexible printed circuit mechanically connected to the actuator base and mechanically isolated from the autofocus voice coil motor.

Figure 3:
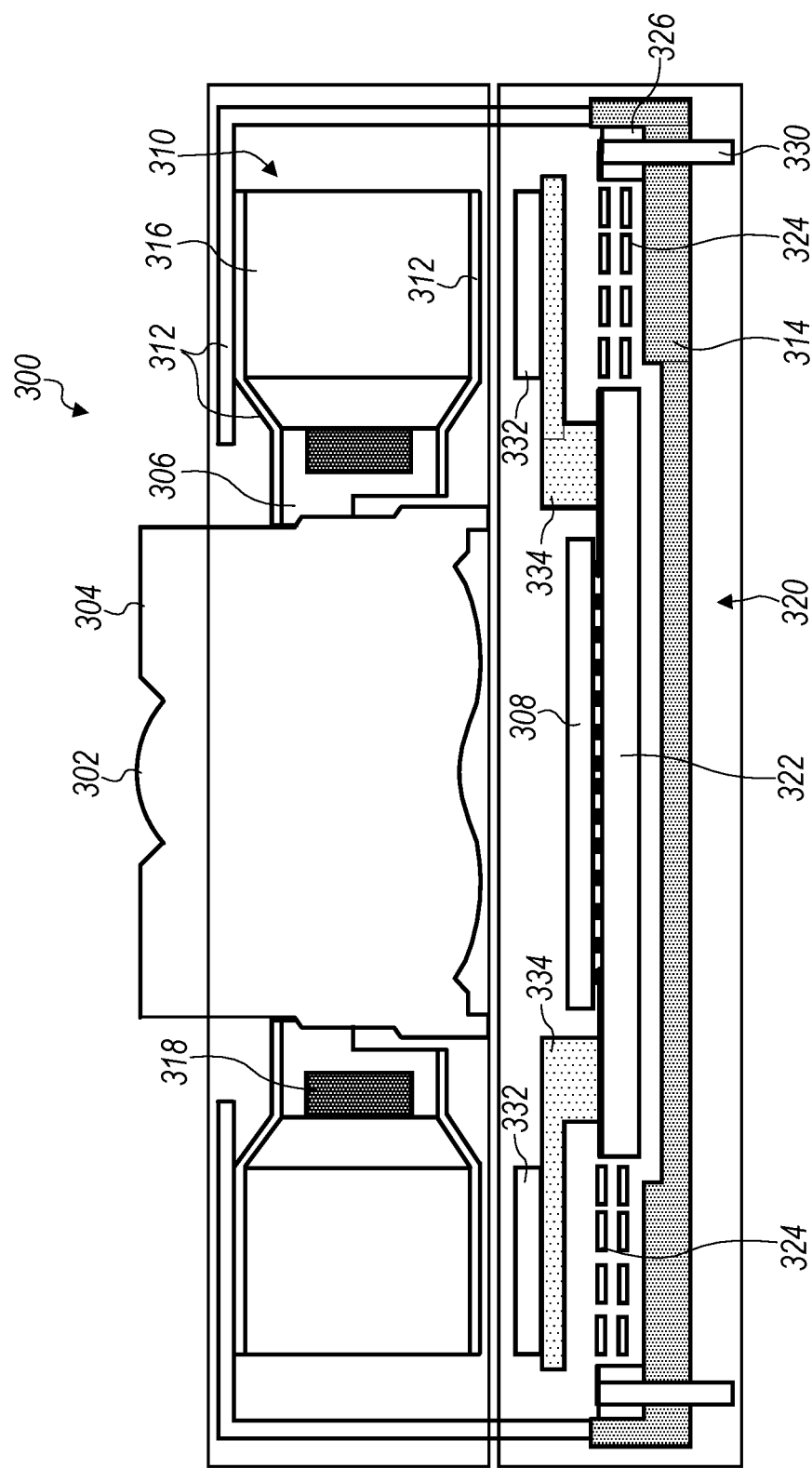
FIG. 3 illustrates an example embodiment of a camera having an actuator module or assembly that includes a multi-layer flexure and that may, for example, be used to provide autofocus through lens assembly movement and optical image stabilization through image sensor movement, according to some embodiments.

FIG. 3 illustrates an example embodiment of a camera having an actuator module or assembly that may, for example, be used to provide autofocus through lens assembly movement and optical image stabilization through image sensor movement in small form factor cameras, according to some embodiments.

In the embodiment illustrated in FIG. 3, camera 300 includes a lens element 302 inside a lens assembly 304 that is packaged in a lens carrier 306. In the embodiment illustrated in FIG. 3, camera 300 includes an image sensor 308 for capturing a digital representation of light transiting the lens element(s) 302. In the embodiment illustrated in FIG. 3, camera 300 includes an axial motion (autofocus) voice coil motor 310 for focusing light from the lens element(s) 302 on the image sensor 308 by moving the lens assembly 304 containing the lens element(s) 302 along an optical axis of the lens element(s) 302. In the embodiment illustrated in FIG. 3, the axial motion voice coil motor 310 includes an autofocus suspension assembly 312 for moveably mounting the lens carrier 306 to an actuator base 314, such that the lens carrier can move relative to the actuator base. In the embodiment illustrated in FIG. 3, the axial motion voice coil motor 310 includes a plurality of shared magnets 316 mounted to the actuator base 314 via autofocus suspension assembly 312, and a focusing coil 318 fixedly mounted to the lens carrier 306 and moveably mounted to the actuator base 314 through the autofocus suspension assembly 312, such that the focusing coil can move with the lens assembly relative to the actuator base.

In the embodiment illustrated in FIG. 3, camera 300 also includes a transverse motion (optical image stabilization OIS) voice coil motor 320. The transverse motion (OIS) voice coil motor 320 includes a dynamic platform 322, flexure arms 324 for mechanically connecting the dynamic platform 322 to a static platform 326, and a plurality of transverse motion (OIS) coils 332 fixedly mounted to the dynamic platform 322 within the magnetic fields of the shared magnets 316, for producing forces for moving the dynamic platform 322 in a plurality of directions orthogonal to the optical axis of the lens element(s) 302.

In some embodiments, the dynamic platform 322, the flexure arms 324 and the static platform 326 are a single metal part or other flexible part. In some embodiments, the flexure arms 324 mechanically connect an image sensor 308 resting on the dynamic platform 322 to a static platform 326 of the transverse motion (optical image stabilization) voice coil motor 320, and the flexure arms support electrical signal traces of a multi-layer flexure to electrical signal traces 330 of the camera 300. In some embodiments, flexure arms 324 include metal flexure bodies carrying electrical signal traces electrically isolated from the metal flexure bodies by polymide insulator layers.

In some embodiments, the optical image stabilization coils 332 are mounted on a flexible printed circuit 334 carrying power to the coils 332 for operation of the (optical image stabilization) transverse motion voice coil motor 320.

In some embodiments, the optical image stabilization coils 332 are corner-mounted on a flexible printed circuit 334 mechanically connected to the actuator base 314 and mechanically isolated from the axial (autofocus) voice coil motor 310.

In some embodiments, a bearing surface end stop is mounted to the base for restricting motion of the optical image stabilization voice coil motor. For example, a bearing surface end stop (or multiple bearing surface end stops) (not shown in FIG. 3) may be mounted between actuator base 314 and dynamic platform 322, such that Z-travel of the dynamic platform 322 is limited in a Z-direction away from lens element 302. For example, at the bottom of a Z-travel distance, the dynamic platform 322 may be stopped by a bearing surface end stop such that the dynamic platform 322 does not impact the actuator base 314.

Figure 4:
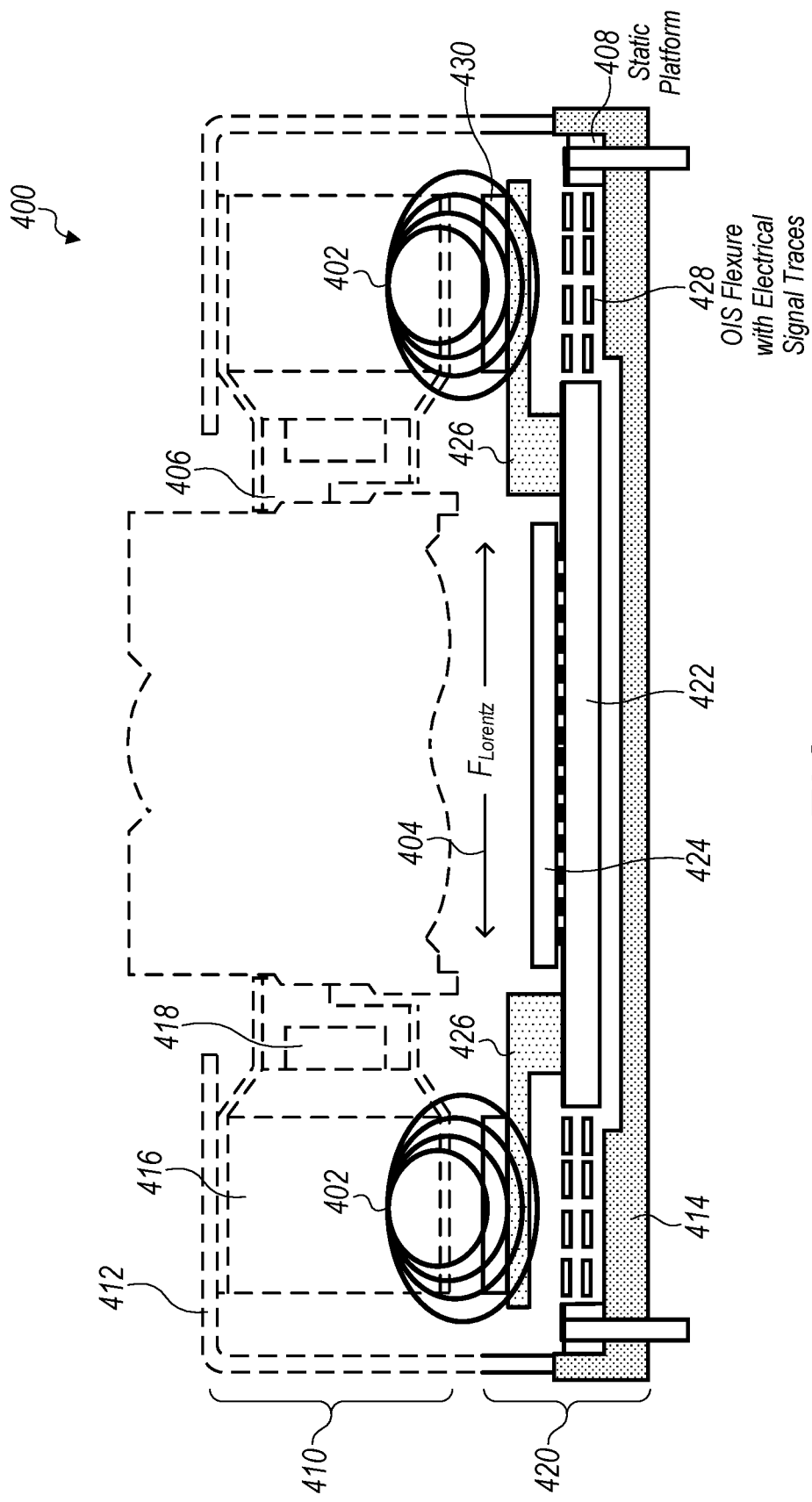
FIG. 4 depicts an example embodiment of a camera having an actuator module or assembly that includes a multi-layer flexure and that may, for example, be used to provide autofocus through lens assembly movement and optical image stabilization through image sensor movement, according to some embodiments.

FIG. 4 depicts an example embodiment of a camera having an actuator module or assembly that includes a multi-layer flexure and that may, for example, be used to provide autofocus through lens assembly movement and optical image stabilization through image sensor movement in small form factor cameras, according to some embodiments.

In some embodiments, a camera actuator 400 includes an actuator base 414, an autofocus voice coil motor 410 and an optical image stabilization voice coil motor 420. The autofocus voice coil motor 410 includes a lens carrier 406 moveably mounted to the actuator base 414 via an autofocus VCM suspension system 412, a plurality of shared magnets 416 mounted to the base 414 via the suspension system 412, and an autofocus coil 418 fixedly mounted to the lens carrier 406 for producing forces in a direction of an optical axis of one or more lens elements of the lens carrier 406.

In some embodiments, the optical image stabilization voice coil motor 420 includes an image sensor carrier 422 (e.g. a dynamic platform) moveably mounted to the actuator base 414 and a plurality of optical image stabilization coils 430 mounted to the image sensor carrier 422 within the magnetic fields 402 of the shared magnets 416, for producing forces 404 for moving the image sensor carrier 422 in a plurality of directions orthogonal to the optical axis.

In some embodiments, the image sensor carrier 422 further includes one or more flexible members 428 (e.g. flexure arms at multiple layers of a multi-layered flexure) for mechanically connecting an image sensor 424 resting on the image sensor carrier 422 to a frame or static platform 408 of the optical image stabilization voice coil motor 420.

In some embodiments, the flexible members (e.g. flexure arms) 428 mechanically and electrically connect an image sensor 424 resting in the image sensor carrier 422 (e.g. dynamic platform) to a frame 408 (e.g. static platform) of the optical image stabilization voice coil motor 420, and the flexible members (e.g. flexure arms) 428 include electrical signal traces. In some embodiments, the flexures arms or flexible members 428 include metal flexure bodies carrying electrical signal traces electrically isolated from the metal flexure bodies by polymide insulator layers. In some embodiments, the optical image stabilization coils 430 are mounted on a flexible printed circuit 426 carrying power to the coils 430 for operation of the optical image stabilization voice coil motor. In some embodiments, the optical image stabilization coils 430 are corner-mounted on a flexible printed circuit 426 mechanically connected to the actuator base 414 and mechanically isolated from the autofocus voice coil motor 410.

Figure 5:
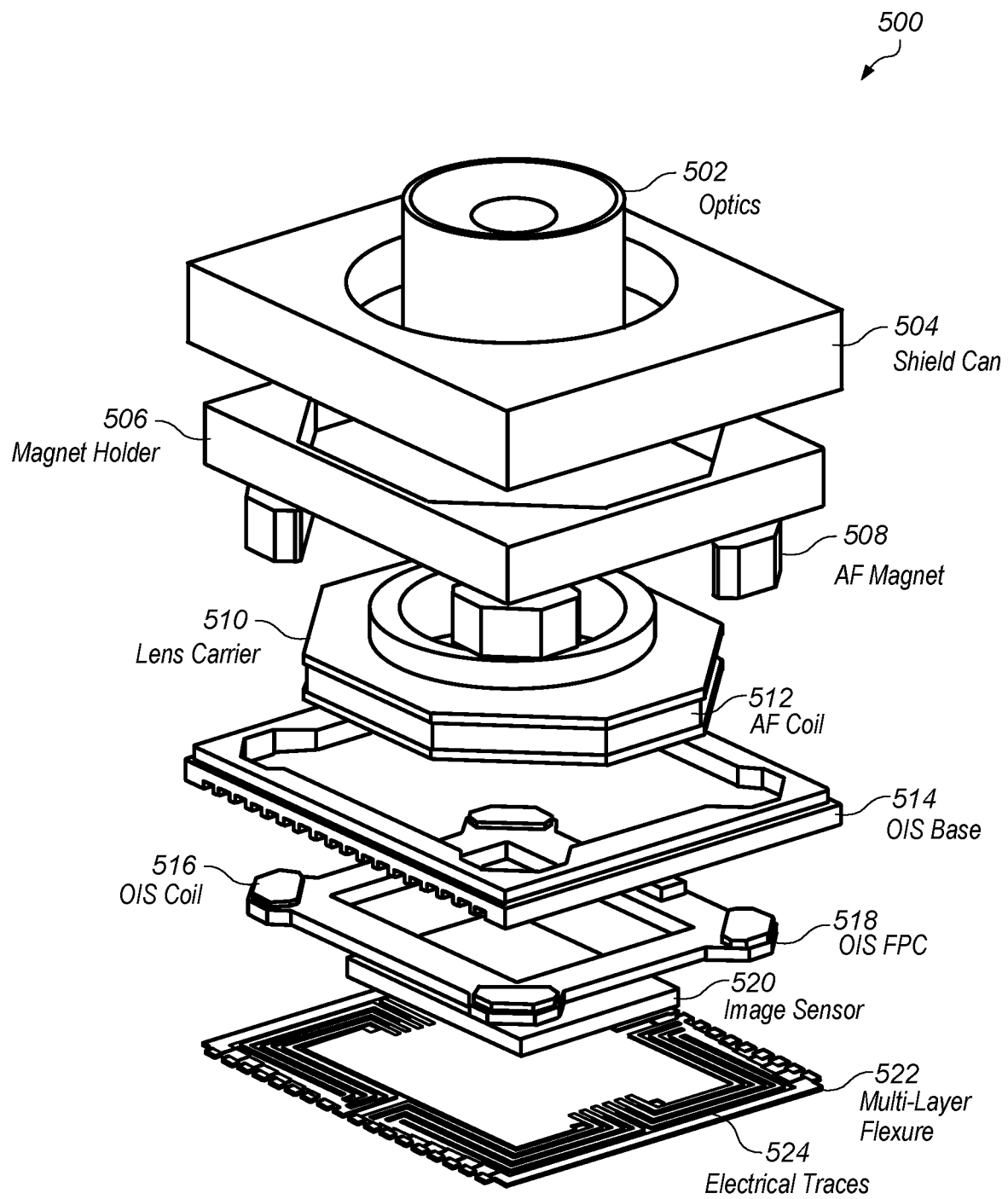
FIG. 5 illustrates an exploded view of components of an example embodiment of a camera having an actuator module or assembly that includes a multi-layer flexure and that may, for example, be used to provide autofocus through lens assembly movement and optical image stabilization through image sensor movement, according to some embodiments.

FIG. 5 illustrates components of an example embodiment of a camera having an actuator module or assembly that includes a multi-layer flexure and that may, for example, be used to provide autofocus through lens assembly movement and optical image stabilization through image sensor movement in small form factor cameras, according to some embodiments. In various embodiments, the camera 500 may include optics 502 (e.g. one or more lens elements mounted in a lens holder), a shield can 504, a magnet holder 506, a magnet 508, a lens carrier 510, an autofocus (AF) coil 512, an optical image stabilization (OIS) base 514, an OIS coil 516, an OIS flexible printed circuit board (FPC) 518, an image sensor 520, a multi-layer flexure 522 (e.g., in accordance with one or more embodiments of the multi-layer flexures described herein), and/or electrical traces 524.

Figure 6B:
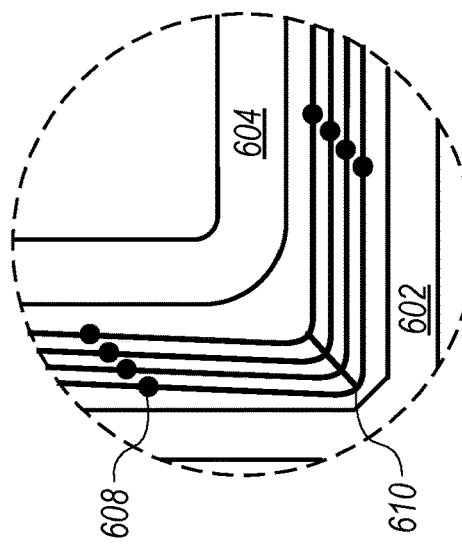
FIGS. 6A-6C illustrates a multi-layer flexure comprising a dynamic platform, a static platform, and multiple layers of flexure arms connecting the static and dynamic platforms shifting the dynamic platform in the X-direction, according to some embodiments.
Figure 6C:
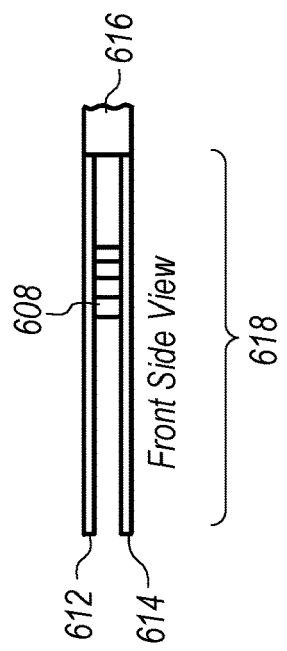
Figure 6A:
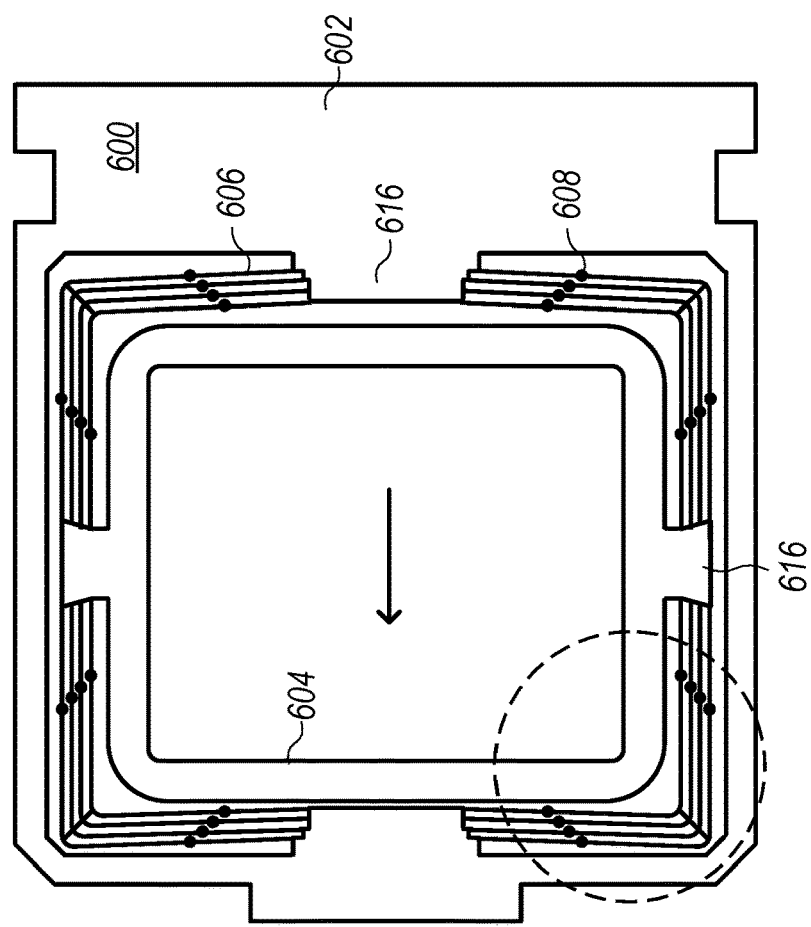

Example Motion of a Dynamic Platform Relative to a Static Platform of a Multi-Layer Flexure FIGS. 6A-6C illustrates a multi-layer flexure comprising a dynamic platform, a static platform, and multiple layers of flexure arms connecting the static and dynamic platforms shifting the dynamic platform in the X-direction, according to some embodiments.

In FIGS. 6A-6C dynamic platform 604 is shifted to the left in the X-direction relative to static platform/static frame 602. For example the dynamic platform may be shifted due to Lorentz forces generated by an OIS VCM actuator. As can be seen flexure arms 606 bend and/or deform to allow the dynamic platform 604 to shift relative to the static platform 602. However, spacer elements 608 mechanically connect flexure arms of an upper layer 612 with flexure arms of a lower layer 614 such that the flexure arms 606 do not move relative to one another in a Z-direction at the point at which the flexure arms are mechanically connected together at spacer elements 608. As previously discussed, this may reduce the effective beam length of the flexure arms 606 and make the multi-layer flexure 600 have a greater stiffness in the Z-direction than in the X-direction or in the Y-direction. In some embodiments, spacer elements 608 are located along a span 618 of flexure arms 606 between a flexure stabilizer 610 located at a corner of the flexure arm arrangement and an offset 616 to which the flexure arms are connected. In some embodiments, the spacer elements 608 are located at or near a midpoint of a span 618 between a flexure stabilizer 610 and an offset 616 of a dynamic platform 604 or an offset 616 of a static platform 602.

In some embodiments, flexure stabilizers, such as flexure stabilizers 610, constrain movement of flexure arms 606 relative to one another at a corner of a flexure arm arrangement (or at another location) in a plane running through a layer of the multi-layer flexure, such as a plane parallel to upper layer 612 and/or lower layer 614. Also, the spacer elements may constrain movement of flexure arms 606 relative to flexure arms of an upper or lower layer in a plane orthogonal to a plane running through upper layer 612 and/or lower layer 614.

Figure 7A:
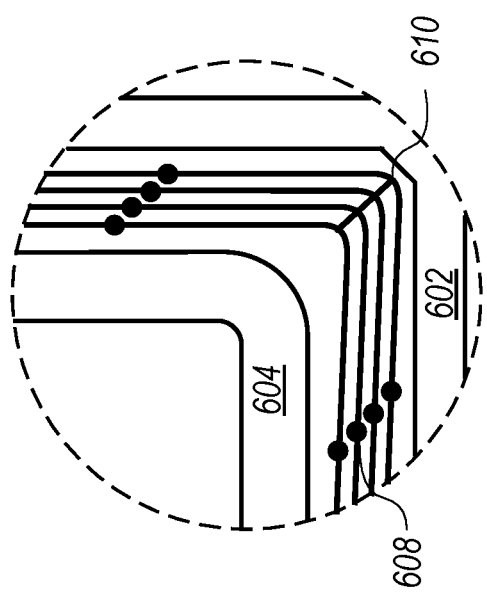

FIGS. 7A-7C illustrates a multi-layer flexure comprising a dynamic platform, a static platform, and multiple layers of flexure arms connecting the static and dynamic platforms shifting the dynamic platform in the Y-direction, according to some embodiments.

In FIGS. 7A-7C dynamic platform 604 is shifted upward in the Y-direction relative to static platform/static frame 602. For example the dynamic platform may be shifted due to Lorentz forces generated by an OIS VCM actuator. As can be seen flexure arms 606 bend and/or deform to allow the dynamic platform 604 to shift relative to the static platform 602. However, spacer elements 608 mechanically connect flexure arms of an upper layer 612 with flexure arms of a lower layer 614 such that the flexure arms 606 do not move relative to one another in a Z-direction at the point at which the flexure arms are mechanically connected together at spacer elements 608. As previously discussed, this may reduce the effective beam length of the flexure arms 606 and make the multi-layer flexure 600 have a greater stiffness in the Z-direction than in the X-direction or in the Y-direction. In some embodiments, spacer elements 608 are located along a span 618 of flexure arms 606 between a flexure stabilizer 610 located at a corner of the flexure arm arrangement and an offset 616 to which the flexure arms are connected. In some embodiments, the spacer elements 608 are located at or near a midpoint of a span 618 between a flexure stabilizer 610 and an offset 616 of a dynamic platform 604 or an offset 616 of a static platform 602.

Example Exploded View of a Multi-Layer Flexure

Figure 8:
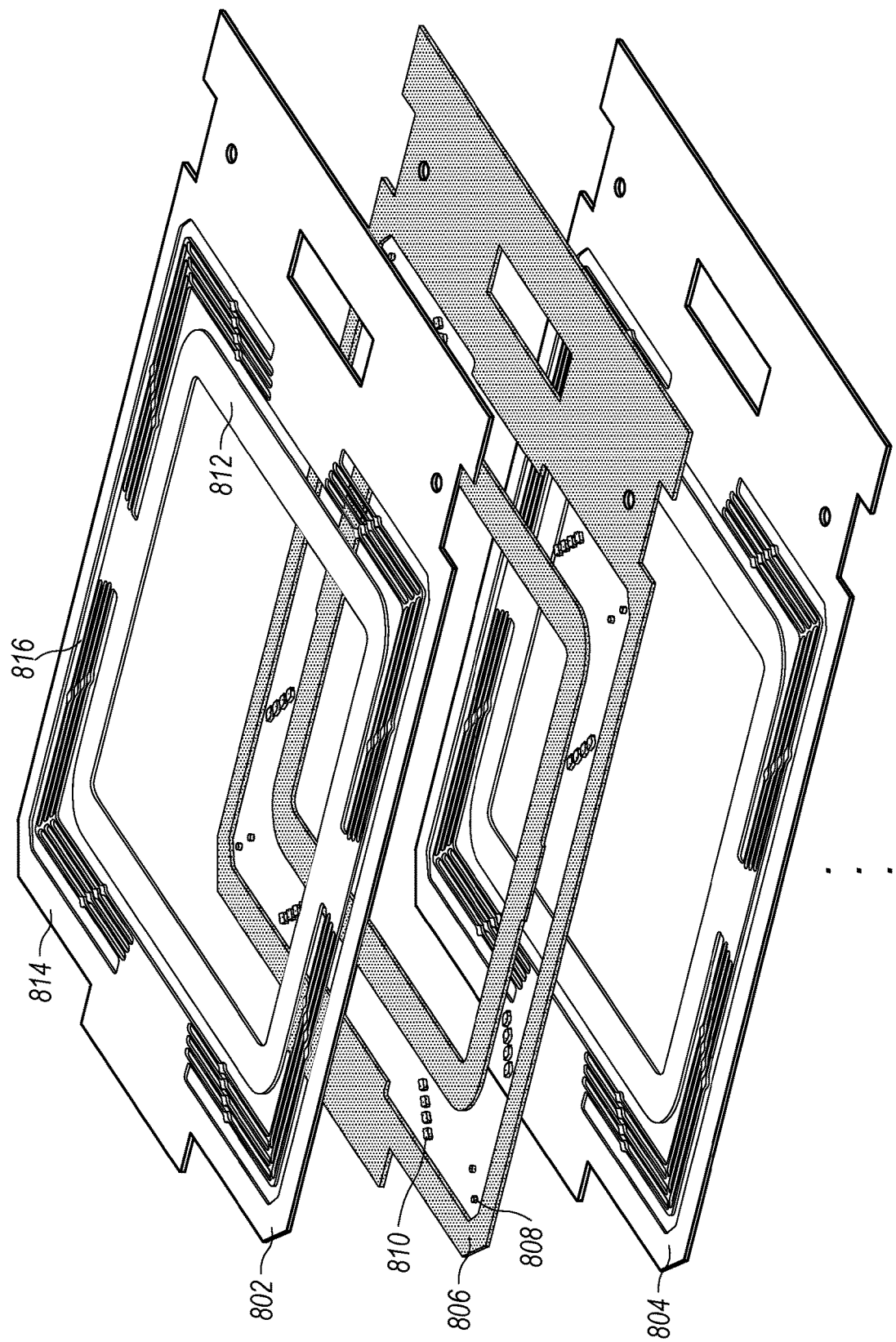
FIG. 8 illustrates an exploded view of a multi-layer flexure comprising a dynamic platform, a static platform, and flexure arms connecting the static and dynamic platforms, according to some embodiments.

FIG. 8 illustrates an exploded view of a multi-layer flexure comprising a dynamic platform, a static platform, and flexure arms connecting the static and dynamic platforms, according to some embodiments.

In some embodiments, a multi-layer flexure, such as multi-layer flexure 102, or any of the multi-layer flexures described herein, may include two or more flexure layers. For example, a multi-layer flexure may include "N" flexure layers in some embodiments, wherein "N" is a number greater than one. For example, in some embodiments, a multi-layer flexure may include 2, 3, 4, or . . . up to "N" flexure layers. For example, the ellipses in FIG. 8 are used to illustrate that additional sets of spacer material and flexure layers could be added to provide more layers to a multi-layer flexure.

Note that the exploded view in FIG. 8. shows the spacer material 806 separated from the upper flexure layer 802 and the lower flexure layer 804, whereas the exploded view shown in FIG. 2 showed the spacer material 116 coupled to the lower flexure layer 112. Also note that the spacer material 116 includes spacer material included in the flexure stabilizers 808 and the spacer elements 810. In some embodiments, each layer of a multi-layer flexure may include a dynamic platform 812, a static platform 814, and flexure arms 816 that mechanically connect the dynamic platform to the static platform. Additionally, electrical traces may be routed along the flexure arms 816 to provide an electrical path between the dynamic platform 812 and the static platform 814.

In some embodiments, some layers may include electrical traces, while other layers do not include electrical traces. For example, some layers may be added to increase a Z-stiffness of a multi-layer flexure, but may not be used to route electrical traces. Conversely, in some embodiments, multiple layers, or all layers, may include flexure arms with electrical traces routed via the flexure arms.

In some embodiments, more than one spacer material may be used. For example, in some embodiments, an adhesive spacer material may be used to bond static platform layers together or to bond dynamic platform layers together, and a solder spacer material may be used to bond layers together at spacer elements.

In some embodiments, a multi-layer flexure with two or more layers may include an additional spacer material similar to spacer material 806 that includes flexure stabilizers 808 and spacer elements 810. The additional spacer material may be located beneath flexure layer 804 and an additional flexure layer similar to flexure layer 804 may be located beneath the additional spacer material. In some embodiments, this pattern may be repeated to add any number of layers to a multi-layer flexure. In some embodiments, multiple ones or all of the layers of a multi-layer flexure may include electrical traces. Also, in some embodiments, some layers of a multi-layer flexure may carry electrical traces while others do not. For example, for a multi-layer flexure with three layers, an upper outer layer and a lower outer layer may include electrical traces, while a middle layer does not (or only includes vias that connect the upper and lower layers). In other embodiments, electrical traces may be carried bay all three layers or other combinations of layers of the three layered flexure.

Example Flexure Arm Configurations

FIGS. 9A-9H each illustrate a cross-sectional view of a respective example flexure arm, in accordance with some embodiments. In some cases, one or more embodiments of the example flexure arms may be used in a multi-layer flexure (e.g., any of the multi-layer flexures described herein such as in FIG. 1-8 or 10) of a voice coil motor (VCM) actuator.

FIG. 9A illustrates a cross-sectional view of a flexure arm 900a, in accordance with some embodiments. For instance, the cross-sectional view of the flexure arm 900a may be taken along a plane that is parallel to the optical axis. The flexure arm 900a may have a width dimension (denoted as "w" in FIG. 9A) and a height dimension (denoted as "h" in FIG. 9A). In some examples, the height dimension may be greater than the width dimension. For instance, in a particular embodiment, the height dimension may be about 40-80 micrometers and the width dimension may be about 20-30 micrometers. It should be understood that the height dimension and/or the width dimension may be any other suitable dimension.

FIG. 9B illustrates a cross-sectional view of a flexure arm 900b, in accordance with some embodiments. The flexure arm 900b may include an electrical trace 902b. The electrical trace 902b may be configured to convey signals (e.g., image signals) from a dynamic platform to a static platform. The electrical trace 902b may be routed along at least a portion of the flexure arm 900b. In some examples, the electrical trace 902b may be located at a top portion of the flexure arm 900b. In other examples, however, the electrical trace 902b may additionally or alternatively be located at a middle and/or bottom portion of the flexure arm 900b. In some cases, the electrical trace 902b may be a conductive material. For instance, the electrical trace 902b may be a copper deposition on the flexure arm 900b. In some embodiments, the electrical trace 902b may be electrically insulated. For instance, the electrical trace 902b may be at least partially coated by a dielectric material 904b (e.g., a polyimide).

FIG. 9C illustrates a cross-sectional view of a flexure arm 900c, in accordance with some embodiments. The flexure arm 900c may include multiple electrical traces 902c (e.g., the electrical trace 902b described above with reference to FIG. 9B). The electrical traces 902c may be oriented side-by-side horizontally such that a horizontal plane passes through the electrical traces 902c. The electrical traces 902c may be routed along at least a portion of the flexure arm 900c. In some examples, the electrical traces 902c may be located at a top portion of the flexure arm 900c. In other examples, however, the electrical traces 902c may additionally or alternatively be located at a middle and/or bottom portion of the flexure arm 900c. In some embodiments, the electrical traces 902c may be electrically insulated from the rest of the flexure arm 900c and/or from each other. For instance, the electrical traces 902c may each be at least partially coated by a dielectric material 904c (e.g., a polyimide).

FIG. 9D illustrates a cross-sectional view of a flexure arm 900d, in accordance with some embodiments. The flexure arm 900d may include multiple electrical traces 902d (e.g., the electrical trace 902b described above with reference to FIG. 9B). The electrical traces 902d may be oriented side-by-side vertically such that a vertical plane passes through the electrical traces 902d. The electrical traces 902d may be routed along at least a portion of the flexure arm 900d. In some examples, the electrical traces 902d may be located at a top portion of the flexure arm 900d. In other examples, however, the electrical traces 902d may additionally or alternatively be located at a middle and/or bottom portion of the flexure arm 900d. In some embodiments, the electrical traces 902d may be electrically insulated from the rest of the flexure arm 900d and/or from each other. For instance, the electrical traces 902d may each be at least partially coated by a dielectric material 904d (e.g., a polyimide).

Figure 9E:
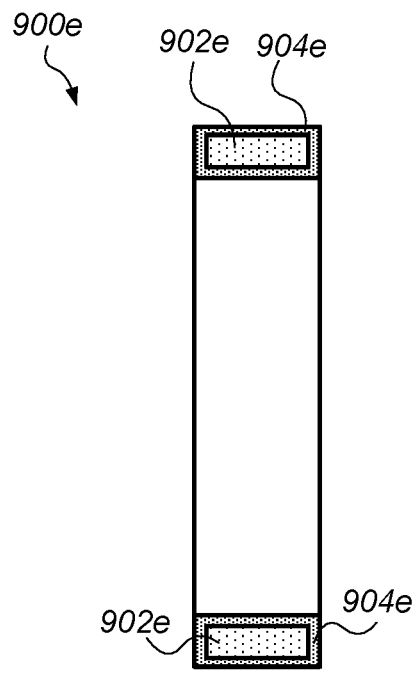

FIG. 9E illustrates a cross-sectional view of a flexure arm 900e, in accordance with some embodiments. The flexure arm 900e may include multiple electrical traces 902e (e.g., the electrical trace 902b described above with reference to FIG. 9B). The electrical traces 902e may be routed from a dynamic platform to a static platform along at least a portion of the flexure arm. In some cases, one or more of the electrical traces 902e may be located at a top portion of the flexure arm 900e, and one or more of the electrical traces 902e may be located at a bottom portion of the flexure arm 900e. In some embodiments, the electrical traces 902d may be electrically insulated from the rest of the flexure arm 900e and/or from each other. For instance, the electrical traces 902d may each be at least partially coated by a dielectric material 904e (e.g., a polyimide).

Figure 9G:
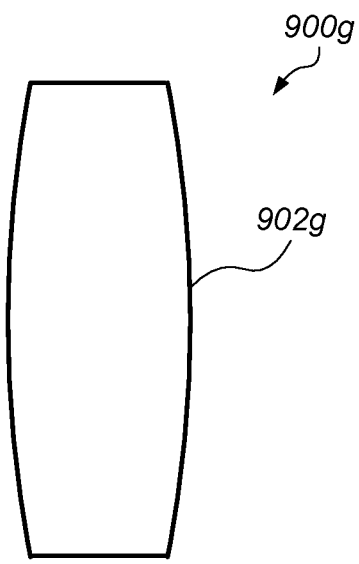
Figure 9F:
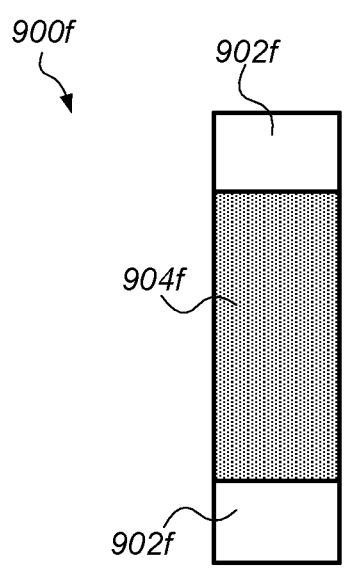

FIG. 9F illustrates a cross-sectional view of a flexure arm 900f, in accordance with some embodiments. The flexure arm 900f may be formed of multiple materials. For instance, the flexure arm 900f may include a first material 902f that sandwiches a second material 904f. In some examples, the first material and/or the second material 904f may include or be one or more electrical traces (e.g., the electrical trace 902b described above with reference to FIG. 9B).

FIG. 9G illustrates a cross-sectional view of a flexure arm 900g, in accordance with some embodiments. The flexure arm 900g may include a concave portion 902g.

Figure 9H:
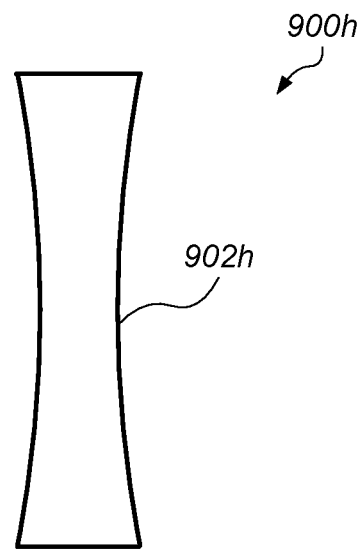

FIG. 9H illustrates a cross-sectional view of a flexure arm 900h, in accordance with some embodiments. The flexure arm 900h may include a convex portion 902h.

In various embodiments, one or more of the flexure stabilizer members described herein may have cross-sections that are similar to, or identical to, one or more of the flexure arms described herein (e.g., with reference to FIGS. 9A-9H).

Example Flexure Arm Arrangements for a Layer of a Multi-Layer Flexure

In some examples, the dynamic platform and/or the static platform of a multi-layer flexure may include one or more offsets (e.g., a recessed portion, an extruded portion, etc.). In some cases, one or more flexure arms may connect to the dynamic platform and/or the static platform at an offset. For instance, the dynamic platform may include two recessed portion offsets at opposing sides of the dynamic platform. However, in some embodiments, the dynamic platform and/or the static platform may include a different offset configuration. Some non-limiting examples of offset configurations are described below with reference to FIGS. 10A-10L.

FIGS. 10A-10L each illustrate a partial top view of a respective example flexure arm configuration, in accordance with some embodiments. In some cases, one or more embodiments of the example flexure arm configurations of FIGS. 10A-10L may be used in a multi-layer flexure (e.g., any of the multi-layered flexures described herein in FIGS. 1-9).

The example flexure module configurations of FIGS. 10A-10L provide some non-limiting examples of design feature variations that may be used in one or more embodiments of the multi-layer flexures, VCM actuators, and/or cameras described herein.

With respect to flexure arms, some of the example flexure arm configurations of FIGS. 10A-10L indicate variations of the flexure arms that include, but are not limited to, one or more of the following:

(1a) The number of flexure arms may vary. For instance, a layer of a multi-layer flexure may include one or multiple flexure arms. In a particular example, a layer of a multi-layer flexure may include four or fewer flexure arms in a flexure arm array.

(2a) The flexure arms may be parallel to each other. However, the flexure arms do not need to be parallel to each other.

(3a) The flexure arms may be parallel to a frame edge (e.g., an edge of a dynamic platform and/or a static platform of a multi-layer flexure).

(4a) The flexure arms may be evenly spaced apart from each other.

(5a) A width of a flexure arms may vary along the flexure arms and/or among the flexure arms;

(6a) The flexure arms may include features (e.g., a recess, an extrusion, an aperture, etc.).

(7a) A cross-section of the flexure arms may be rectangular, concave, and/or convex in shape.

(8a) The flexure arms may be a solid material, clad, or switched beam.

With respect to turning points (also referred to herein as "bend portions" or "inflection points") of the flexure arms (or flexure arm arrays), some of the example flexure module configurations of FIGS. 10A-10L indicate variations of the turning points that include, but are not limited to, one or more of the following:

(1b) The flexure arms may include one or more turning points.

(2b) A turning angle of the turning points may vary. In some examples, the turning angle may be 90 degrees. However, in other examples, the turning angle may be an angle other than 90 degrees.

(3b) The turning radii of the turning points may vary.

With respect to flexure stabilizer members, some of the example flexure module configurations of FIGS. 10A-10L indicate variations of the flexure stabilizer members that include, but are not limited to, one or more of the following:

(1c) One or more flexure stabilizer members may connect the flexure arms.

(2c) A flexure stabilizer member may connect some or all of the flexure arms.

(3c) The locations of the flexure stabilizer members may be anywhere on the flexure arms. In some examples, the locations of the flexure stabilizer members may be different among the flexure arms.

(4c) An angle between the flexure stabilizer members and the flexure arms may vary. In some examples, the angle between the flexure stabilizer member and the flexure arms may be 90 degrees. However, in other examples, the angle may be an angle other than 90 degrees.

With respect to offsets of the dynamic platform and/or static platform, some of the example flexure module configurations of FIGS. 10A-10L indicate variations of the offsets that include, but are not limited to, one or more of the following:

(1d) An offset may exist at a flexure arm root where flexure arms connect to the dynamic platform and/or the static platform.

(2d) The offset may be, for example, a recess, an extrusion, etc.

With respect to flexure arm connecting angles to the dynamic platform and/or the static platform, some of the example flexure module configurations of FIGS. 10A-10L indicate variations of the flexure arm connecting angles that include, but are not limited to, one or more of the following:

(1e) The flexure arm connecting angles may vary. In some examples, a flexure arm connecting angle may be 90 degrees. However, in other examples, the flexure arm connecting angle may be an angle other than 90 degrees.

(2e) Different flexure arms may have different flexure arm connecting angles.

(3e) For dynamic platforms and/or static platforms with an offset, the flexure arms may be connected to any available edge of the offset.

With respect to flexure arm patterns (which, in some cases, may include a pattern formed by the flexure arms and the flexure stabilizer members), some of the example flexure module configurations of FIGS. 10A-10L indicate variations of the flexure arm patterns that include, but are not limited to, one or more of the following:

(1f) The flexure arm pattern may be symmetric. For instance, the flexure arm pattern may be symmetric along at least two axes (e.g., the x and y axes) that are orthogonal to the optical axis.

(1g) The flexure arm pattern may be asymmetric. For instance, the flexure arm pattern may be asymmetric along at least one axis (e.g., the x axis or the y axis) that is orthogonal to the optical axis.

With respect to spacer element patterns, spacer element patterns may include, but are not limited to, one or more of the following:

The spacer element pattern may be symmetric, asymmetric, etc. The spacer elements may be located at midpoints between spans between offsets and flexure stabilizers. Also the spacer elements may follow different patterns on different layers of a multi-layer flexure. For example, for multi-layer flexures with more than two layers, some layers may have more spacers between them then other layers.

FIG. 10A illustrates a partial top view of a flexure module configuration 1000a, in accordance with some embodiments. The flexure module configuration 1000a includes a dynamic platform configuration 1002a, a static platform configuration 1004a, a flexure arm configuration 1006a, and a flexure stabilizer member configuration 1008a.

FIG. 10B illustrates a partial top view of a flexure module configuration 1000b, in accordance with some embodiments. The flexure module configuration 1000b includes a dynamic platform configuration 1002b, a static platform configuration 1004b, a flexure arm configuration 1006b, and a flexure stabilizer member configuration 1008b.

FIG. 10C illustrates a partial top view of a flexure module configuration 1000c, in accordance with some embodiments. The flexure module configuration 1000c includes a dynamic platform configuration 1002c, a static platform configuration 1004c, a flexure arm configuration 1006c, and a flexure stabilizer member configuration 1008c.

FIG. 10D illustrates a partial top view of a flexure module configuration 1000d, in accordance with some embodiments. The flexure module configuration 1000d includes a dynamic platform configuration 1002d, a static platform configuration 1004d, and a flexure arm configuration 1006d.

FIG. 10E illustrates a partial top view of a flexure module configuration 1000e, in accordance with some embodiments. The flexure module configuration 1000e includes a dynamic platform configuration 1002e, a static platform configuration 1004e, and a flexure arm configuration 1006e.

FIG. 10F illustrates a partial top view of a flexure module configuration 1000f, in accordance with some embodiments. The flexure module configuration 1000f includes a dynamic platform configuration 1002f, a static platform configuration 1004f, a flexure arm configuration 1006f, and a flexure stabilizer member configuration 1008f.

FIG. 10G illustrates a partial top view of a flexure module configuration 1000g, in accordance with some embodiments. The flexure module configuration 1000g includes a dynamic platform configuration 1002g, a static platform configuration 1004g, and a flexure arm configuration 1006g.

FIG. 10H illustrates a partial top view of a flexure module configuration 1000h, in accordance with some embodiments. The flexure module configuration 1000h includes a dynamic platform configuration 1002h, a static platform configuration 1004h, and a flexure arm configuration 1006h.

Figure 10I:
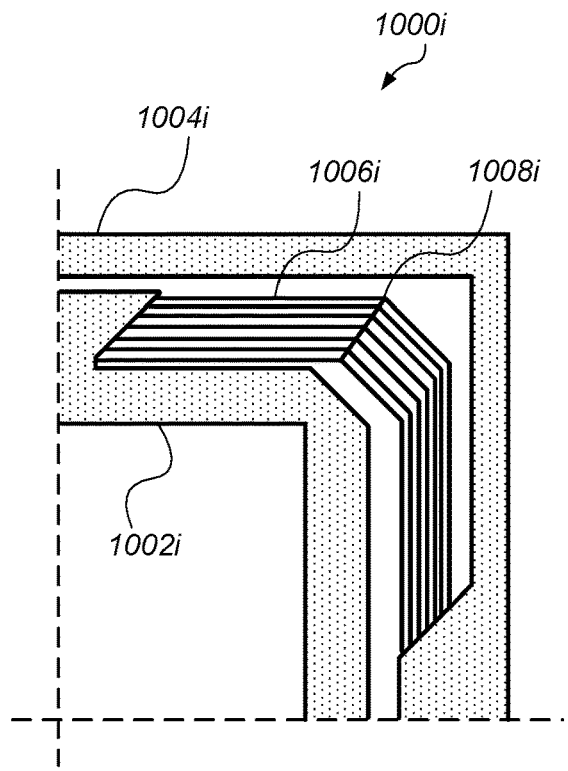

FIG. 10I illustrates a partial top view of a flexure module configuration 1000i, in accordance with some embodiments. The flexure module configuration 1000i includes a dynamic platform configuration 1002i, a static platform configuration 1004i, a flexure arm configuration 1006i, and a flexure stabilizer member configuration 1008i.

Figure 10K:
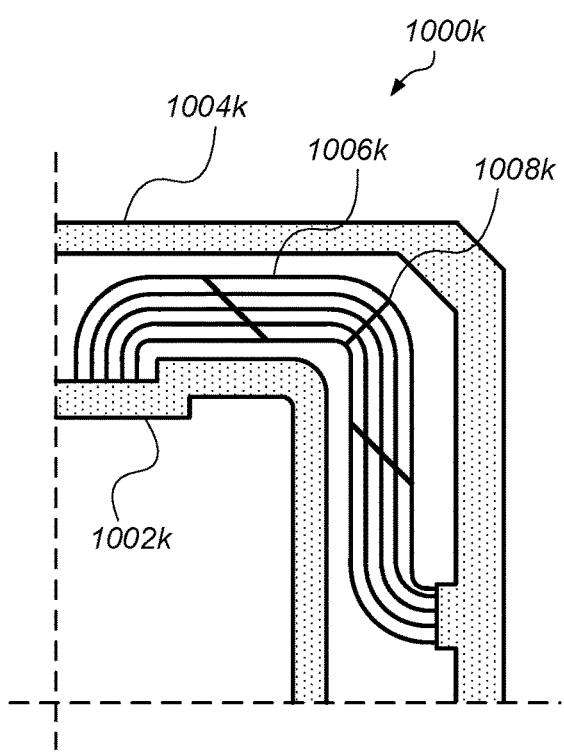
Figure 10J:
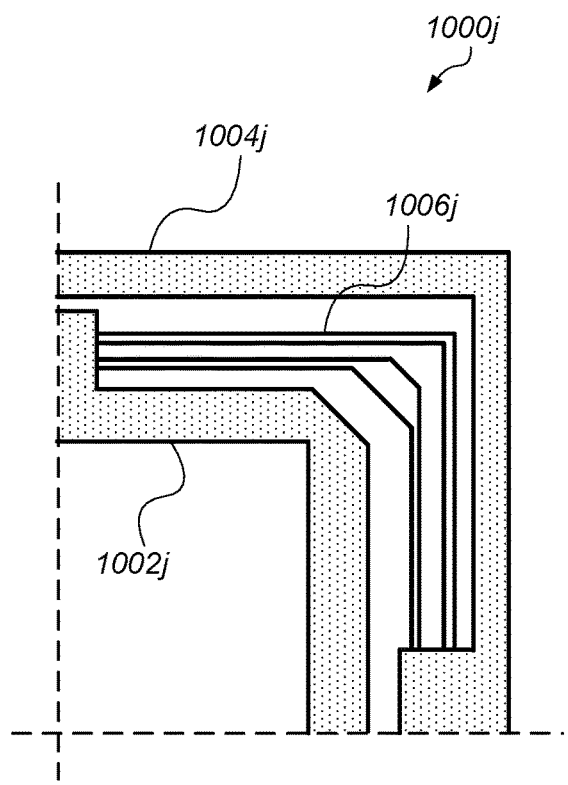

FIG. 10J illustrates a partial top view of a flexure module configuration 1000j, in accordance with some embodiments. The flexure module configuration 1000j includes a dynamic platform configuration 1002j, a static platform configuration 1004j, and a flexure arm configuration 1006j.

FIG. 10K illustrates a partial top view of a flexure module configuration 1000k, in accordance with some embodiments. The flexure module configuration 1000k includes a dynamic platform configuration 1002k, a static platform configuration 1004k, a flexure arm configuration 1006k, and a flexure stabilizer member configuration 1008k.

Figure 10L:
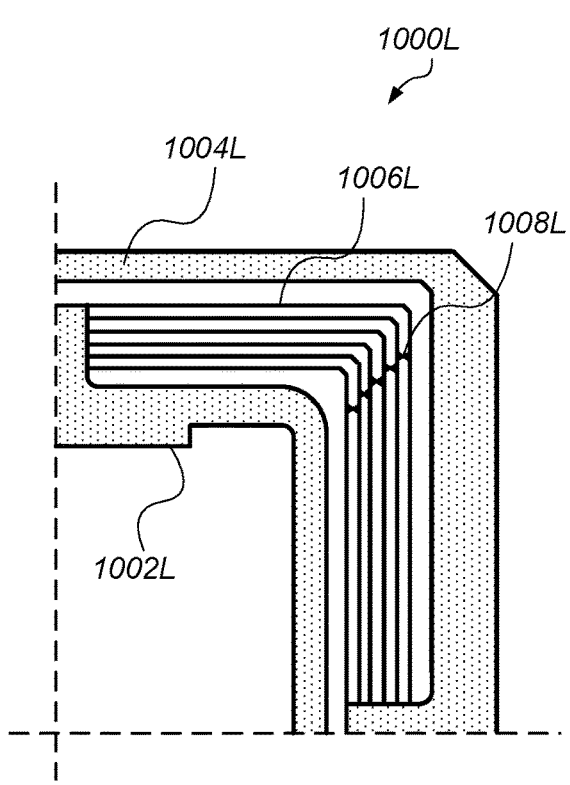

FIG. 10L illustrates a partial top view of a flexure module configuration 1000L, in accordance with some embodiments. The flexure module configuration 1000L includes a dynamic platform configuration 1002L, a static platform configuration 1004L, a flexure arm configuration 1006L, and a flexure stabilizer member configuration 1008L.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 11:
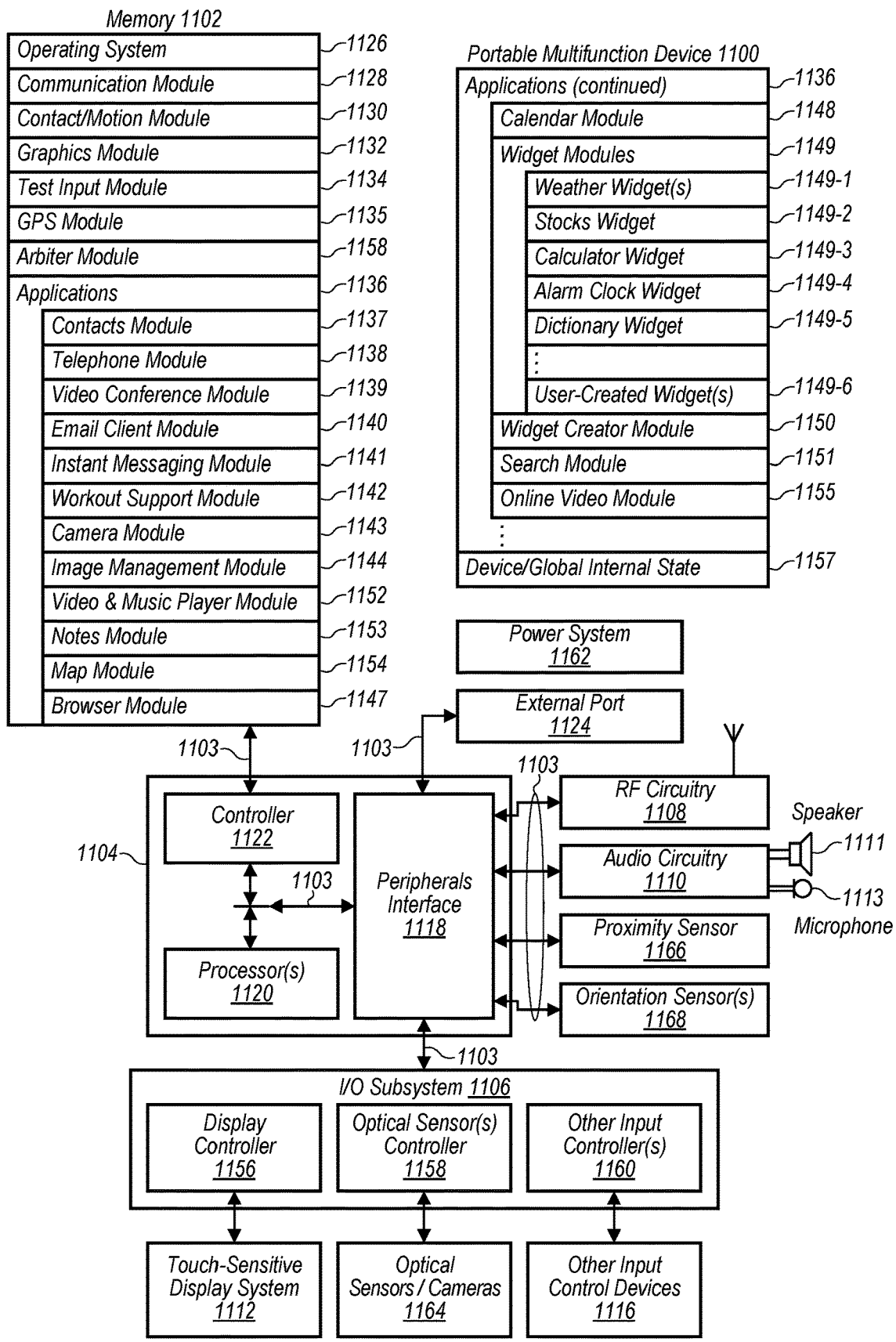
FIG. 11 illustrates a block diagram of a portable multifunction device with a camera, in accordance with some embodiments.

Attention is now directed toward embodiments of portable devices with cameras. FIG. 11 illustrates a block diagram of an example portable multifunction device 1100 that may include one or more cameras (e.g., the cameras described above with reference to FIGS. 3-5), in accordance with some embodiments. Cameras 1164 are sometimes called "optical sensors" for convenience, and may also be known as or called an optical sensor system. Device 1100 may include memory 1102 (which may include one or more computer readable storage mediums), memory controller 1122, one or more processing units (CPUs) 1120, peripherals interface 1118, RF circuitry 1108, audio circuitry 1110, speaker 1111, touch-sensitive display system 1112, microphone 1113, input/output (I/O) subsystem 1106, other input or control devices 1116, and external port 1124. Device 1100 may include multiple optical sensors 1164. These components may communicate over one or more communication buses or signal lines 1103.

It should be appreciated that device 1100 is only one example of a portable multifunction device, and that device 1100 may have more or fewer components than shown, may combine two or more components, or may have a different configuration or arrangement of the components. The various components shown in FIG. 11 may be implemented in hardware, software, or a combination of hardware and software, including one or more signal processing and/or application specific integrated circuits.

Memory 1102 may include high-speed random access memory and may also include non-volatile memory, such as one or more magnetic disk storage devices, flash memory devices, or other non-volatile solid-state memory devices. Access to memory 1102 by other components of device 1100, such as CPU 1120 and the peripherals interface 1118, may be controlled by memory controller 1122.

Peripherals interface 1118 can be used to couple input and output peripherals of the device to CPU 1120 and memory 1102. The one or more processors 1120 run or execute various software programs and/or sets of instructions stored in memory 1102 to perform various functions for device 1100 and to process data.

In some embodiments, peripherals interface 1118, CPU 1120, and memory controller 1122 may be implemented on a single chip, such as chip 1104. In some other embodiments, they may be implemented on separate chips.

RF (radio frequency) circuitry 1108 receives and sends RF signals, also called electromagnetic signals. RF circuitry 1108 converts electrical signals to/from electromagnetic signals and communicates with communications networks and other communications devices via the electromagnetic signals. RF circuitry 1108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1110, speaker 1111, and microphone 1113 provide an audio interface between a user and device 1100. Audio circuitry 1110 receives audio data from peripherals interface 1118, converts the audio data to an electrical signal, and transmits the electrical signal to speaker 1111. Speaker 1111 converts the electrical signal to human-audible sound waves. Audio circuitry 1110 also receives electrical signals converted by microphone 1113 from sound waves. Audio circuitry 1110 converts the electrical signal to audio data and transmits the audio data to peripherals interface 1118 for processing. Audio data may be retrieved from and/or transmitted to memory 1102 and/or RF circuitry 1108 by peripherals interface 1118. In some embodiments, audio circuitry 1110 also includes a headset jack (e.g., 1212, FIG. 12). The headset jack provides an interface between audio circuitry 1110 and removable audio input/output peripherals, such as output-only headphones or a headset with both output (e.g., a headphone for one or both ears) and input (e.g., a microphone).

I/O subsystem 1106 couples input/output peripherals on device 1100, such as touch screen 1112 and other input control devices 1116, to peripherals interface 1118. I/O subsystem 1106 may include display controller 1156 and one or more input controllers 1160 for other input or control devices. The one or more input controllers 1160 receive/send electrical signals from/to other input or control devices 1116. The other input control devices 1116 may include physical buttons (e.g., push buttons, rocker buttons, etc.), dials, slider switches, joysticks, click wheels, and so forth. In some alternate embodiments, input controller(s) 1160 may be coupled to any (or none) of the following: a keyboard, infrared port, USB port, and a pointer device such as a mouse. The one or more buttons (e.g., 1208, FIG. 12) may include an up/down button for volume control of speaker 1111 and/or microphone 1113. The one or more buttons may include a push button (e.g., 1206, FIG. 12).

Touch-sensitive display 1112 provides an input interface and an output interface between the device and a user. Display controller 1156 receives and/or sends electrical signals from/to touch screen 1112. Touch screen 1112 displays visual output to the user. The visual output may include graphics, text, icons, video, and any combination thereof (collectively termed "graphics"). In some embodiments, some or all of the visual output may correspond to user-interface objects.

Touch screen 1112 has a touch-sensitive surface, sensor or set of sensors that accepts input from the user based on haptic and/or tactile contact. Touch screen 1112 and display controller 1156 (along with any associated modules and/or sets of instructions in memory 1102) detect contact (and any movement or breaking of the contact) on touch screen 1112 and converts the detected contact into interaction with user-interface objects (e.g., one or more soft keys, icons, web pages or images) that are displayed on touch screen 1112. In an example embodiment, a point of contact between touch screen 1112 and the user corresponds to a finger of the user.

Touch screen 1112 may use LCD (liquid crystal display) technology, LPD (light emitting polymer display) technology, or LED (light emitting diode) technology, although other display technologies may be used in other embodiments. Touch screen 1112 and display controller 1156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1112. In an example embodiment, projected mutual capacitance sensing technology is used, such as that found in the iPhone®, iPod Touch®, and iPad® from Apple Inc. of Cupertino, Calif.

Touch screen 1112 may have a video resolution in excess of 800 dpi. In some embodiments, the touch screen has a video resolution of approximately 860 dpi. The user may make contact with touch screen 1112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1112 or an extension of the touch-sensitive surface formed by the touch screen.

Device 1100 also includes power system 1162 for powering the various components. Power system 1162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1100 may also include one or more optical sensors or cameras 1164. FIG. 11 shows an optical sensor 1164 coupled to optical sensor controller 1158 in I/O subsystem 1106. Optical sensor 1164 may include charge-coupled device (CCD) or complementary metal-oxide semiconductor (CMOS) phototransistors. Optical sensor 1164 receives light from the environment, projected through one or more lens, and converts the light to data representing an image. In conjunction with imaging module 1143 (also called a camera module), optical sensor 1164 may capture still images or video. In some embodiments, an optical sensor 1164 is located on the back of device 1100, opposite touch screen display 1112 on the front of the device, so that the touch screen display 1112 may be used as a viewfinder for still and/or video image acquisition. In some embodiments, another optical sensor is located on the front of the device so that the user's image may be obtained for videoconferencing while the user views the other video conference participants on the touch screen display.

Device 1100 may also include one or more proximity sensors 1166. FIG. 11 shows proximity sensor 1166 coupled to peripherals interface 1118. Alternately, proximity sensor 1166 may be coupled to input controller 1160 in I/O subsystem 1106. In some embodiments, the proximity sensor 1166 turns off and disables touch screen 1112 when the multifunction device 1100 is placed near the user's ear (e.g., when the user is making a phone call).

Device 1100 includes one or more orientation sensors 1168. In some embodiments, the one or more orientation sensors 1168 include one or more accelerometers (e.g., one or more linear accelerometers and/or one or more rotational accelerometers). In some embodiments, the one or more orientation sensors 1168 include one or more gyroscopes. In some embodiments, the one or more orientation sensors 1168 include one or more magnetometers. In some embodiments, the one or more orientation sensors 1168 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1100. In some embodiments, the one or more orientation sensors 1168 include any combination of orientation/rotation sensors. FIG. 11 shows the one or more orientation sensors 1168 coupled to peripherals interface 1118. Alternately, the one or more orientation sensors 1168 may be coupled to an input controller 1160 in I/O subsystem 1106. In some embodiments, information is displayed on the touch screen display 1112 in a portrait view or a landscape view based on an analysis of data received from the one or more orientation sensors 1168.

In some embodiments, the software components stored in memory 1102 include operating system 1126, communication module (or set of instructions) 1128, contact/motion module (or set of instructions) 1130, graphics module (or set of instructions) 1132, text input module (or set of instructions) 1134, Global Positioning System (GPS) module (or set of instructions) 1135, arbiter module 1158 and applications (or sets of instructions) 1136. Furthermore, in some embodiments memory 1102 stores device/global internal state 1157. Device/global internal state 1157 includes one or more of: active application state, indicating which applications, if any, are currently active; display state, indicating what applications, views or other information occupy various regions of touch screen display 1112; sensor state, including information obtained from the device's various sensors and input control devices 1116; and location information concerning the device's location and/or attitude.

Operating system 1126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1128 facilitates communication with other devices over one or more external ports 1124 and also includes various software components for handling data received by RF circuitry 1108 and/or external port 1124. External port 1124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 1130 may detect contact with touch screen 1112 (in conjunction with display controller 1156) and other touch sensitive devices (e.g., a touchpad or physical click wheel). Contact/motion module 1130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1130 and display controller 1156 detect contact on a touchpad.

Contact/motion module 1130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1132 includes various known software components for rendering and displaying graphics on touch screen 1112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1132 stores data representing graphics to be used. Each graphic may be assigned a corresponding code. Graphics module 1132 receives, from applications etc., one or more codes specifying graphics to be displayed along with, if necessary, coordinate data and other graphic property data, and then generates screen image data to output to display controller 1156.

Text input module 1134, which may be a component of graphics module 1132, provides soft keyboards for entering text in various applications (e.g., contacts 1137, e-mail 1140, IM 1141, browser 1147, and any other application that needs text input).

GPS module 1135 determines the location of the device and provides this information for use in various applications (e.g., to telephone 1138 for use in location-based dialing, to camera 1143 as picture/video metadata, and to applications that provide location-based services such as weather widgets, local yellow page widgets, and map/navigation widgets).

Applications 1136 may include the following modules (or sets of instructions), or a subset or superset thereof:
- contacts module 1137 (sometimes called an address book or contact list);
- telephone module 1138;
- video conferencing module 1139;
- e-mail client module 1140;
- instant messaging (IM) module 1141;
- workout support module 1142;
- camera module 1143 for still and/or video images;
- image management module 1144;
- browser module 1147;
- calendar module 1148;
- widget modules 1149, which may include one or more of: weather widget 1149-1, stocks widget 1149-2, calculator widget 1149-3, alarm clock widget 1149-4, dictionary widget 1149-5, and other widgets obtained by the user, as well as user-created widgets 1149-6;
- widget creator module 1150 for making user-created widgets 1149-6;
- search module 1151;
- video and music player module 1152, which may be made up of a video player module and a music player module;
- notes module 1153;
- map module 1154; and/or
- online video module 1155.

Examples of other applications 1136 that may be stored in memory 1102 include other word processing applications, other image editing applications, drawing applications, presentation applications, JAVA-enabled applications, encryption, digital rights management, voice recognition, and voice replication.

In conjunction with touch screen 1112, display controller 1156, contact module 1130, graphics module 1132, and text input module 1134, contacts module 1137 may be used to manage an address book or contact list (e.g., stored in application internal state 1157), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1138, video conference 1139, e-mail 1140, or IM 1141; and so forth.

In conjunction with RF circuitry 1108, audio circuitry 1110, speaker 1111, microphone 1113, touch screen 1112, display controller 1156, contact module 1130, graphics module 1132, and text input module 1134, telephone module 1138 may be used to enter a sequence of characters corresponding to a telephone number, access one or more telephone numbers in address book 1137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1108, audio circuitry 1110, speaker 1111, microphone 1113, touch screen 1112, display controller 1156, optical sensor 1164, optical sensor controller 1158, contact module 1130, graphics module 1132, text input module 1134, contact list 1137, and telephone module 1138, videoconferencing module 1139 includes executable instructions to initiate, conduct, and terminate a video conference between a user and one or more other participants in accordance with user instructions.

In conjunction with RF circuitry 1108, touch screen 1112, display controller 1156, contact module 1130, graphics module 1132, and text input module 1134, e-mail client module 1140 includes executable instructions to create, send, receive, and manage e-mail in response to user instructions. In conjunction with image management module 1144, e-mail client module 1140 makes it very easy to create and send e-mails with still or video images taken with camera module 1143.

In conjunction with RF circuitry 1108, touch screen 1112, display controller 1156, contact module 1130, graphics module 1132, and text input module 1134, the instant messaging module 1141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1108, touch screen 1112, display controller 1156, contact module 1130, graphics module 1132, text input module 1134, GPS module 1135, map module 1154, and music player module 1146, workout support module 1142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1112, display controller 1156, optical sensor(s) 1164, optical sensor controller 1158, contact module 1130, graphics module 1132, and image management module 1144, camera module 1143 includes executable instructions to capture still images or video (including a video stream) and store them into memory 1102, modify characteristics of a still image or video, or delete a still image or video from memory 1102.

In conjunction with touch screen 1112, display controller 1156, contact module 1130, graphics module 1132, text input module 1134, and camera module 1143, image management module 1144 includes executable instructions to arrange, modify (e.g., edit), or otherwise manipulate, label, delete, present (e.g., in a digital slide show or album), and store still and/or video images.

In conjunction with RF circuitry 1108, touch screen 1112, display system controller 1156, contact module 1130, graphics module 1132, and text input module 1134, browser module 1147 includes executable instructions to browse the Internet in accordance with user instructions, including searching, linking to, receiving, and displaying web pages or portions thereof, as well as attachments and other files linked to web pages.

In conjunction with RF circuitry 1108, touch screen 1112, display system controller 1156, contact module 1130, graphics module 1132, text input module 1134, e-mail client module 1140, and browser module 1147, calendar module 1148 includes executable instructions to create, display, modify, and store calendars and data associated with calendars (e.g., calendar entries, to do lists, etc.) in accordance with user instructions.

In conjunction with RF circuitry 1108, touch screen 1112, display system controller 1156, contact module 1130, graphics module 1132, text input module 1134, and browser module 1147, widget modules 1149 are mini-applications that may be downloaded and used by a user (e.g., weather widget 549-1, stocks widget 549-2, calculator widget 1149-3, alarm clock widget 1149-4, and dictionary widget 1149-5) or created by the user (e.g., user-created widget 1149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1108, touch screen 1112, display system controller 1156, contact module 1130, graphics module 1132, text input module 1134, and browser module 1147, the widget creator module 1150 may be used by a user to create widgets (e.g., turning a user-specified portion of a web page into a widget).

In conjunction with touch screen 1112, display system controller 1156, contact module 1130, graphics module 1132, and text input module 1134, search module 1151 includes executable instructions to search for text, music, sound, image, video, and/or other files in memory 1102 that match one or more search criteria (e.g., one or more user-specified search terms) in accordance with user instructions.

In conjunction with touch screen 1112, display system controller 1156, contact module 1130, graphics module 1132, audio circuitry 1110, speaker 1111, RF circuitry 1108, and browser module 1147, video and music player module 1152 includes executable instructions that allow the user to download and play back recorded music and other sound files stored in one or more file formats, such as MP3 or AAC files, and executable instructions to display, present or otherwise play back videos (e.g., on touch screen 1112 or on an external, connected display via external port 1124). In some embodiments, device 1100 may include the functionality of an MP3 player.

In conjunction with touch screen 1112, display controller 1156, contact module 1130, graphics module 1132, and text input module 1134, notes module 1153 includes executable instructions to create and manage notes, to do lists, and the like in accordance with user instructions.

In conjunction with RF circuitry 1108, touch screen 1112, display system controller 1156, contact module 1130, graphics module 1132, text input module 1134, GPS module 1135, and browser module 1147, map module 1154 may be used to receive, display, modify, and store maps and data associated with maps (e.g., driving directions; data on stores and other points of interest at or near a particular location; and other location-based data) in accordance with user instructions.

In conjunction with touch screen 1112, display system controller 1156, contact module 1130, graphics module 1132, audio circuitry 1110, speaker 1111, RF circuitry 1108, text input module 1134, e-mail client module 1140, and browser module 1147, online video module 1155 includes instructions that allow the user to access, browse, receive (e.g., by streaming and/or download), play back (e.g., on the touch screen or on an external, connected display via external port 1124), send an e-mail with a link to a particular online video, and otherwise manage online videos in one or more file formats, such as H.264. In some embodiments, instant messaging module 1141, rather than e-mail client module 1140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1102 may store a subset of the modules and data structures identified above. Furthermore, memory 1102 may store additional modules and data structures not described above.

In some embodiments, device 1100 is a device where operation of a predefined set of functions on the device is performed exclusively through a touch screen and/or a touchpad. By using a touch screen and/or a touchpad as the primary input control device for operation of device 1100, the number of physical input control devices (such as push buttons, dials, and the like) on device 1100 may be reduced.

The predefined set of functions that may be performed exclusively through a touch screen and/or a touchpad include navigation between user interfaces. In some embodiments, the touchpad, when touched by the user, navigates device 1100 to a main, home, or root menu from any user interface that may be displayed on device 1100. In such embodiments, the touchpad may be referred to as a "menu button." In some other embodiments, the menu button may be a physical push button or other physical input control device instead of a touchpad.

Figure 12:
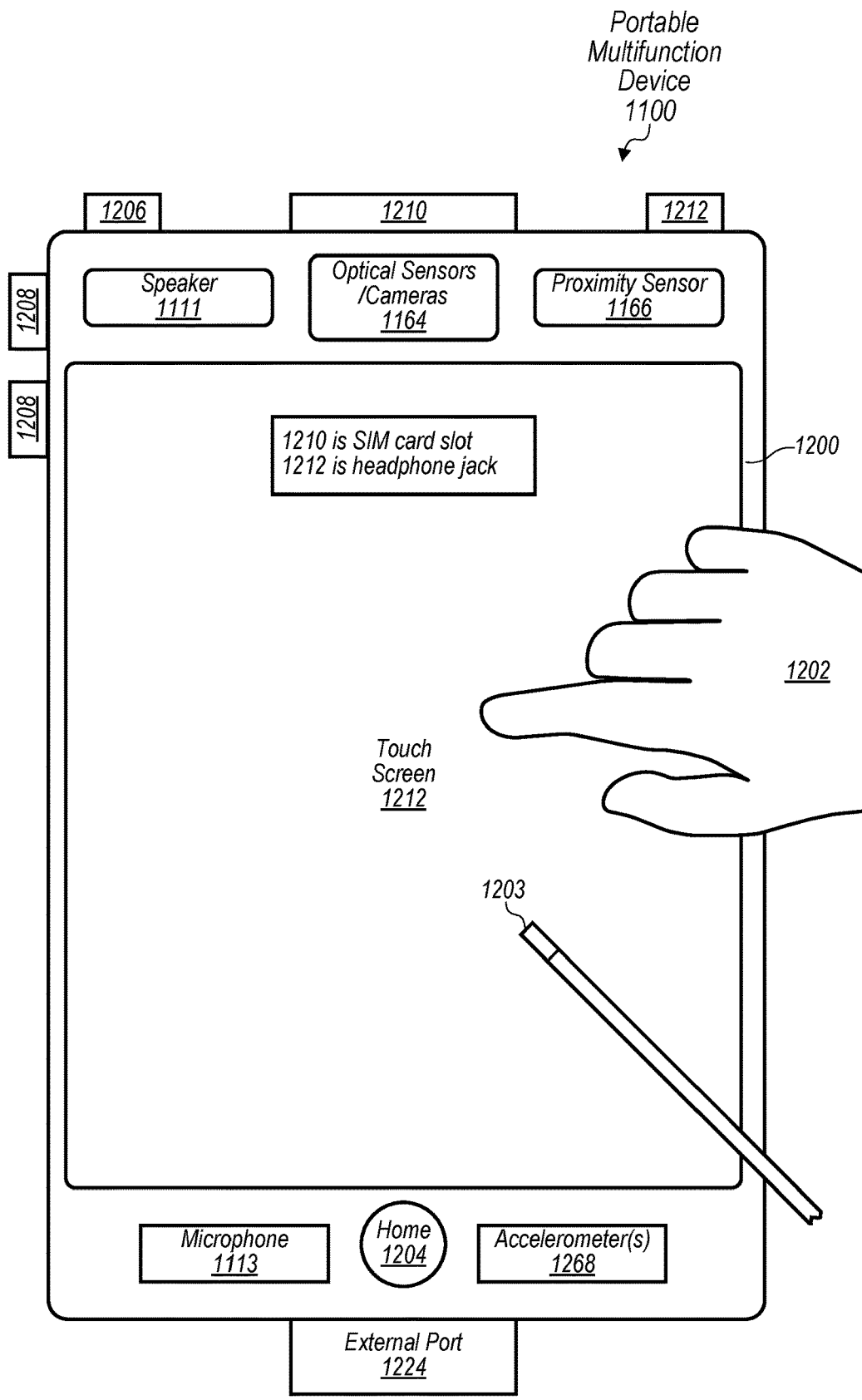
FIG. 12 depicts a portable multifunction device having a camera, in accordance with some embodiments.

FIG. 12 depicts illustrates an example portable multifunction device 1100 that may include one or more cameras (e.g., the cameras described above with reference to FIGS. 3-5), in accordance with some embodiments. The device 1100 may have a touch screen 1112. The touch screen 1112 may display one or more graphics within user interface (UI) 1200. In this embodiment, as well as others described below, a user may select one or more of the graphics by making a gesture on the graphics, for example, with one or more fingers 1202 (not drawn to scale in the figure) or one or more styluses 1203 (not drawn to scale in the figure).

Device 1100 may also include one or more physical buttons, such as "home" or menu button 1204. As described previously, menu button 1204 may be used to navigate to any application 1136 in a set of applications that may be executed on device 1100. Alternatively, in some embodiments, the menu button 1204 is implemented as a soft key in a GUI displayed on touch screen 1112.

In one embodiment, device 1100 includes touch screen 1112, menu button 1204, push button 1206 for powering the device on/off and locking the device, volume adjustment button(s) 1208, Subscriber Identity Module (SIM) card slot 1210, head set jack 1212, and docking/charging external port 1224. Push button 1206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1100 also may accept verbal input for activation or deactivation of some functions through microphone 1113.

It should be noted that, although many of the examples herein are given with reference to optical sensor(s)/camera (s) 1164 (on the front of a device), one or more rear-facing cameras or optical sensors that are pointed opposite from the display may be used instead of, or in addition to, an optical sensor(s)/camera(s) 1164 on the front of a device.

Example Computer System

Figure 13:
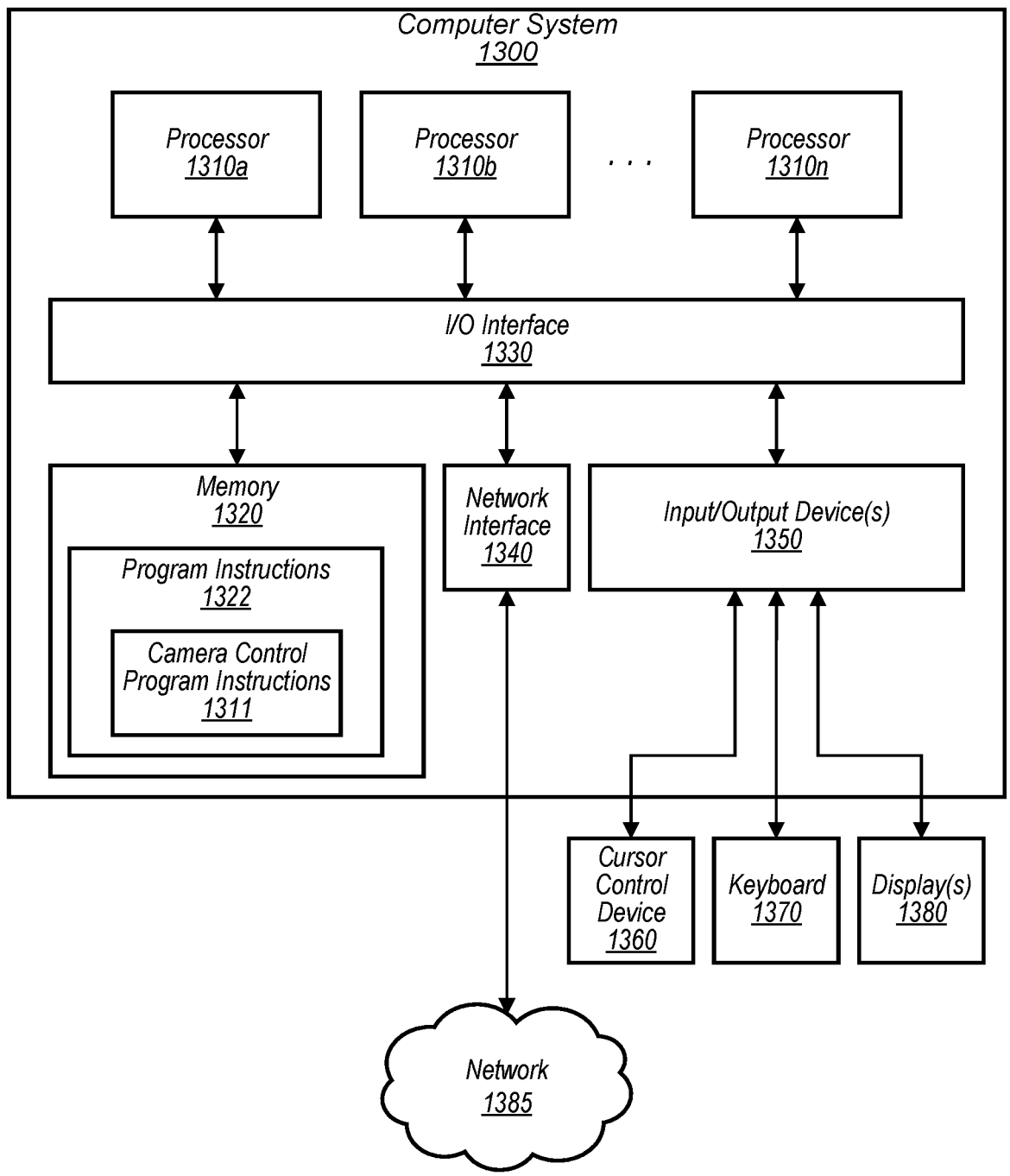
FIG. 13 illustrates an example computer system that may include a camera, in accordance with some embodiments. The example computer system may be configured to implement aspects of the system and method for camera control discussed herein, in accordance with some embodiments.

FIG. 13 illustrates an example computer system 1300 that may include one or more cameras (e.g., the cameras described above with reference to FIGS. 3-5), according to some embodiments. The computer system 1300 may be configured to execute any or all of the embodiments described above. In different embodiments, computer system 1300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1300, which may interact with various other devices. Note that any component, action, or functionality described above with respect to FIGS. 3-5 and 11-12 may be implemented on one or more computers configured as computer system 1300 of FIG. 13, according to various embodiments. In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store camera control program instructions 1322 and/or camera control data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions 1322 may be configured to implement a lens control application 1324 incorporating any of the functionality described above. Additionally, existing camera control data 1332 of memory 1320 may include any of the information or data structures described above. In some embodiments, program instructions and/or data may be received, sent or stored upon different types of computer-accessible media or on similar media separate from system memory 1320 or computer system 1300. While computer system 1300 is described as implementing the functionality of functional blocks of previous Figures, any of the functionality described herein may be implemented via such a computer system.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network 1385 (e.g., carrier or agent devices) or between nodes of computer system 1300. Network 1385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1322, which may be processor-executable to implement any element or action described above. In one embodiment, the program instructions may implement the methods described above. In other embodiments, different elements and data may be included. Note that data may include any data or information described above.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a lens holder and one or more lens elements coupled to the lens holder, wherein the one or more lens elements define an optical axis for the camera;
an image sensor configured to capture light passing through the one or more lens elements and convert the captured light into image signals; and
a flexure assembly comprising:
a first frame coupled to the image sensor such that:
the image sensor moves together with the first frame; and
the first frame receives the image signals from the image sensor;
a second frame coupled to a stationary component of the camera;
a first layer of flexure arms configured to mechanically connect the first frame to the second frame; and
a second layer of flexure arms, mounted above or below the first layer of flexure arms, configured to mechanically connect the first frame to the second frame;
wherein first layer of flexure arms and the second layer of flexure arms are separated at least in part by an open space between the flexure arms.

2. The camera of claim 1, wherein the flexure assembly further comprises:
spacer elements that mechanically connect respective ones of the flexure arms of the first layer with respective ones of the flexure arms of the second layer at one or more respective points along respective spans of the flexure arms of the first and second layers.

3. The camera of claim 1, wherein the flexure assembly further comprises:
electrical traces routed from the first frame to the second frame via the first layer of flexure arms and via the second layer of flexure arms,
wherein the electrical traces are configured to convey the image signals from the first frame to the second frame.

4. The camera of claim 3, further comprising:
one or more flexure stabilizer members configured to mechanically connect flexure arms of the first layer, or second layer, with other flexure arms of the first layer, or second layer, such that the one or more flexure stabilizer members prevent interference between the flexure arms of the first layer, or second layer.

5. The camera of claim 4, wherein the spacer elements are positioned on the respective spans of the flexure arms between respective connections to the first frame or second frame and the respective ones of the one or more flexure stabilizer members.

6. The camera of claim 5, wherein the one or more flexure stabilizer members constrain movement of the flexure arms relative to one another in a plane running through the first layer or the second layer.

7. The camera of claim 6, wherein the spacer elements constrain movement of the flexure arms relative to flexure arms of another layer, at the respective points, in a direction perpendicular to a plane running through the first layer or the second layer.

8. The camera of claim 5, wherein the spacer elements comprise a spacer material that mechanically connects the flexure arms of the first layer to flexure arms of the second layer at the respective points,
wherein the first frame comprises a first layer and a second layer mechanically connected to one another via the spacer material;
wherein the second frame comprises a first layer and a second layer mechanically connected to one another via the spacer material; and
wherein portions of the flexure arms of the first layer and flexure arms of the second layer that are not mechanically connected via the spacer elements at the respective points are separated by an air gap.

9. A voice coil motor (VCM) actuator, comprising:
one or more actuator magnets;
one or more actuator coils;
a dynamic platform configured to be coupled to an image sensor;
a static platform configured to be static relative to the dynamic platform;
a first layer of flexure arms configured to mechanically connect the dynamic platform to the static platform; and
a second layer of flexure arms, mounted above or below the first layer of flexure arms, and configured to mechanically connect the dynamic platform to the static platform;
wherein the first layer of flexure arms and the second layer of flexure arms are separated at least in part by an open space between the respective flexure arms of the first layer and the second layer; and
wherein the one or more actuator magnets and the one or more actuator coils are configured to magnetically interact to move the dynamic platform relative to the static platform in a plurality of directions parallel to a plane running through the first layer and the second layer of flexure arms.

10. The voice coil motor actuator of claim 9, further comprising
spacer elements that mechanically connect respective ones of the flexure arms of the first layer with respective ones of the flexure arms of the second layer at one or more respective points along respective spans of the flexure arms of the first and the second layers.

11. The voice coil motor actuator of claim 10, wherein the spacer elements comprise an adhesive bonding material, a solder material, or a metal plating that mechanically connects the flexure arms of the first layer with the flexure arms of the second layer at the one or more respective points along the respective spans of the flexure arms of the first and the second layers.

12. The voice coil motor of claim 11, wherein the flexure arms of the first layer and the flexure arms of the second layer mechanically connected at the one or more respective points via the spacer elements cause the dynamic platform to be more rigidly connected to the static platform in a Z-direction perpendicular to a plane running through the first and the second layers than in an X-direction or a Y-direction parallel to the plane running through the first layer and the second layers.

13. The voice coil motor actuator of claim 9, further comprising:
one or more flexure stabilizer members configured to mechanically connect flexure arms of the first layer, or the second layer, with other flexure arms of the first layer, or the second layer, such that the one or more flexure stabilizer members prevent interference between the flexure arms of the first layer, or the second layer.

14. The voice coil motor actuator of claim 9, further comprising:
electrical traces routed from the dynamic platform to the static platform via the first layer of flexure arms and the second layer of flexure arms,
wherein the electrical traces are configured to convey image signals from an image sensor coupled to the dynamic platform to circuits connected to the static platform.

15. The voice coil motor actuator of claim 14, wherein more than one electrical trace is routed via an individual one of the flexure arms of the first layer or the second layer.

16. The voice coil motor actuator of claim 9, wherein the first layer, or the second layer, of flexure arms comprises respective sets of four or fewer flexure arms in respective quadrants of the first layer, or second layer.

17. A mobile multifunction device comprising:
a camera module, comprising:
one or more lens elements that define an optical axis; and
an image sensor configured to capture light passing through the one or more lens elements and convert the captured light into image signals;
a dynamic frame coupled with the image sensor;
a static frame configured to be static relative to the dynamic frame;
a first layer of flexure arms that mechanically connect the dynamic frame to the static frame; and
a second layer of flexure arms, mounted above or below the first layer of flexure arms, that mechanically connect the dynamic frame to the static frame, wherein first layer of flexure arms and the second layer of flexure arms are separated at least in part by an open space between the flexure arms of the first layer and the second layer; and
electrical traces configured to convey the image signals from the dynamic frame to the static frame;
a display; and
one or more processors configured to:
cause the display to present an image based at least in part on one or more of the image signals that have been conveyed from the dynamic frame to the static frame via the electrical traces.

18. The multifunction device of claim 17, further comprising a voice coil motor actuator comprising:

one or more actuator magnets; and one or more actuator coils, wherein the one or more processor are configured to:

cause the voice coil motor actuator to move the dynamic frame relative to the static frame in a plurality of directions orthogonal to the optical axis.

19. The multifunction device of claim 17, further comprising:

spacer elements that mechanically connect respective ones of the flexure arms of the first layer with respective ones of the flexure arms of the second layer at respective points along respective spans of the flexure arms of the first and second layers.

20. The multifunction device of claim 17, further comprising:

one or more additional layers of flexure arms, mounted above or below the first layer or the second layer of flexure arms, configured to mechanically connect the dynamic frame to the static frame, wherein each of the one or more additional layers of flexure arms are separated from the other ones of the layers of flexure arms by an open space between the layers of flexure arms.

* * * * *